United States Patent [19]

Dahlquist et al.

[11] 4,081,614
[45] Mar. 28, 1978

[54] SUPERVISED SINGLE LINK TELEPHONE SYSTEM

[75] Inventors: James E. Dahlquist, Elk Grove Village; Dilip T. Singhi, Skokie, both of Ill.

[73] Assignee: Rauland-Borg Corporation, Chicago, Ill.

[21] Appl. No.: 787,608

[22] Filed: Apr. 14, 1977

[51] Int. Cl.$^2$ .................... H04M 5/20; H04Q 3/64
[52] U.S. Cl. ............................ 179/18 AD; 179/1 H; 179/37
[58] Field of Search .......... 179/1 H, 5.5, 7 R, 18 AD, 179/18 BA, 18 BG, 18 BW, 27 FB, 27 FC, 27 D, 27 R, 37–40, 81 C, 84 L, 99; 235/92 TE, 91 E

[56] References Cited

U.S. PATENT DOCUMENTS

| | | | |
|---|---|---|---|
| 2,896,021 | 7/1959 | Philipps | 179/1 H |
| 3,304,376 | 2/1967 | Truby | 179/1 H |
| 3,355,555 | 11/1967 | Thelemaque | 179/18 BG |
| 3,553,385 | 1/1971 | Morgan et al. | 179/18 BG |
| 3,604,854 | 9/1971 | Jacobaeus | 179/84 L |
| 3,809,824 | 5/1974 | Dahlquist et al. | 179/18 AD |
| 3,928,732 | 12/1975 | Simon et al. | 179/99 |
| 3,991,282 | 11/1976 | Feil | 179/99 |
| 4,032,724 | 6/1977 | Matheny | 179/99 |

FOREIGN PATENT DOCUMENTS

1,170,331 11/1969 United Kingdom .................. 179/5.5

*Primary Examiner*—Kathleen H. Claffy
*Assistant Examiner*—Gerald L. Brigance
*Attorney, Agent, or Firm*—Leydig, Voit, Osann, Mayer & Holt, Ltd.

[57] ABSTRACT

An administrative telephone system for use in schools, hospitals and the like which includes a dialable administrative telephone set and a plurality of dialless remote or "staff" telephone stations having identifying numbers, interconnected by a central exchange. The administrator can dial any staff telephone station by pressing two digit buttons on the dial pad. Associated with the administrative telephone set is a digital display device having a column of display positions. Each staff telephone station has a call-in switch. The central exchange includes storage provision coupled to the digital display for registering and displaying, in order, the numbers of the staff telephone sets which have called in and thus have indicated a desire to communicate with the administrator. By pressing the asterisk (*) pushbutton switch at the administrative telephone set, the latter is automatically connected to the staff telephone station whose number is displayed at the head of the display column, such head number being thereafter extinguished, and with the numbers in successive positions each being advanced forwardly one step in the column. The administrator can thus connect his telephone in quick succession to a series of calls stacked in the display simply by successive pressing of the pushbutton switch. Each staff telephone station has provision for sending a priority signal in addition to the regular call-in signal, under urgent or emergency conditions, and which is effective, upon receipt by the central exchange, to advance the number of the particular station overridingly to the head position in the column of the display device, the display of the number being enhanced by flashing and by an audible note to attract attention.

19 Claims, 18 Drawing Figures

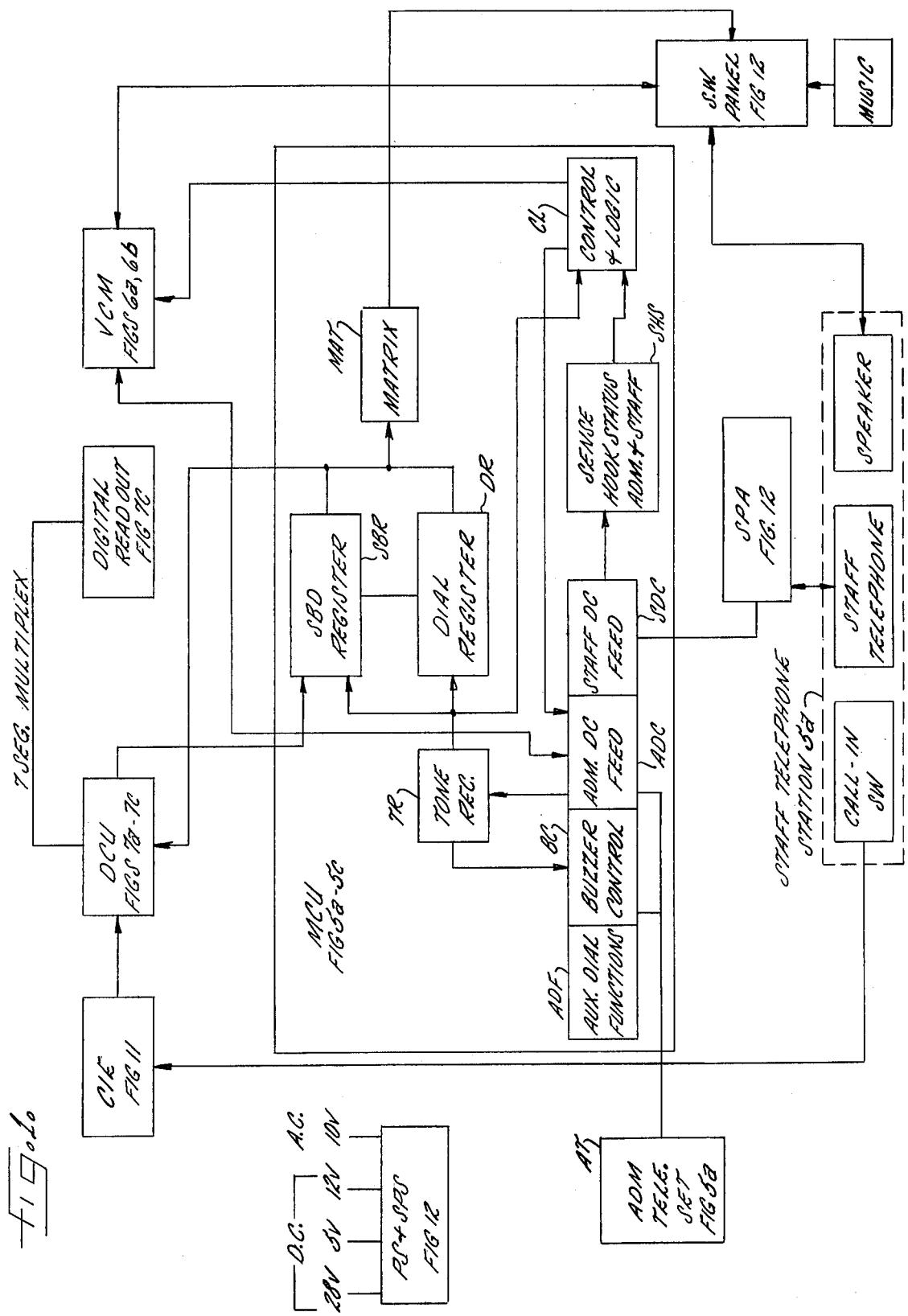

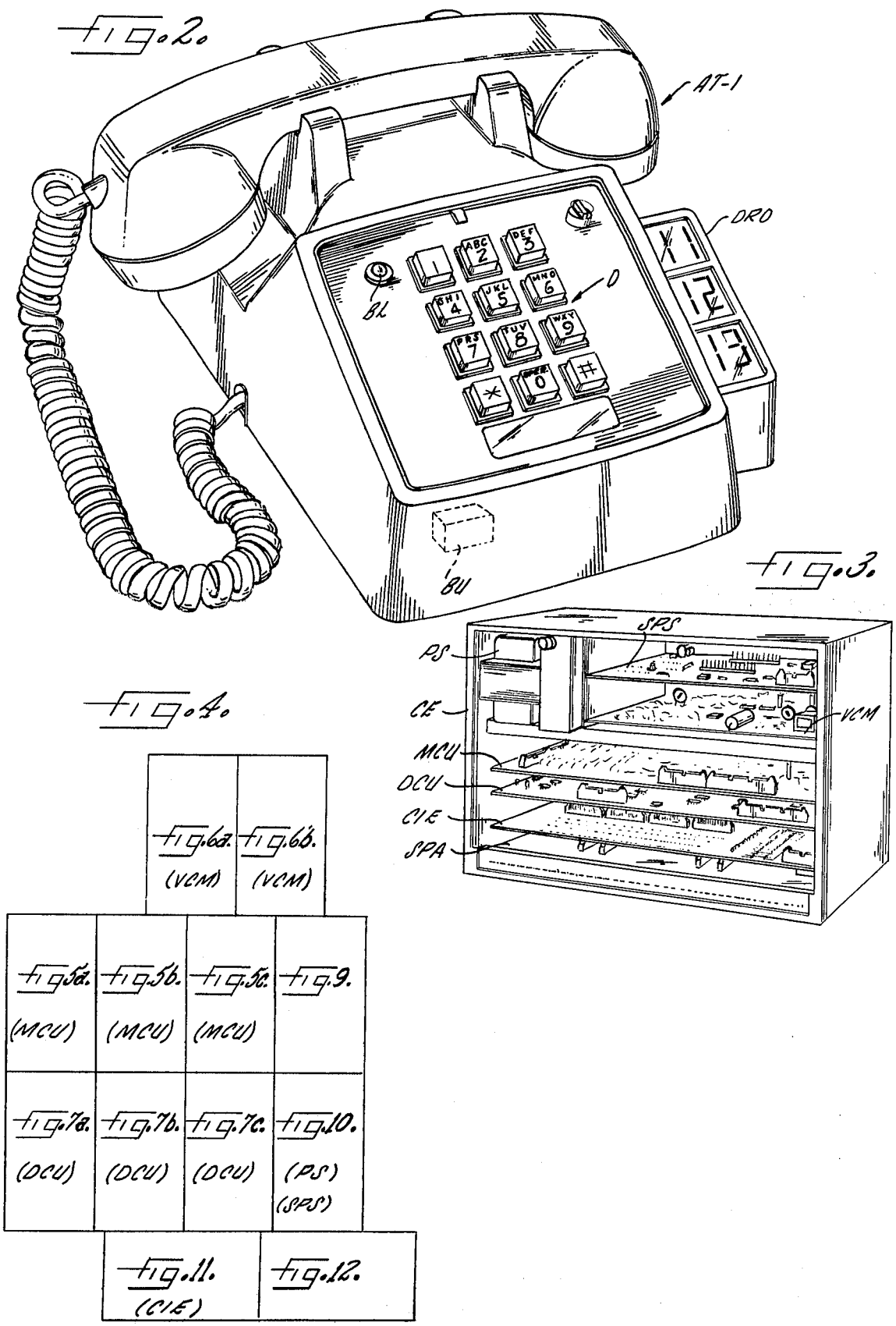

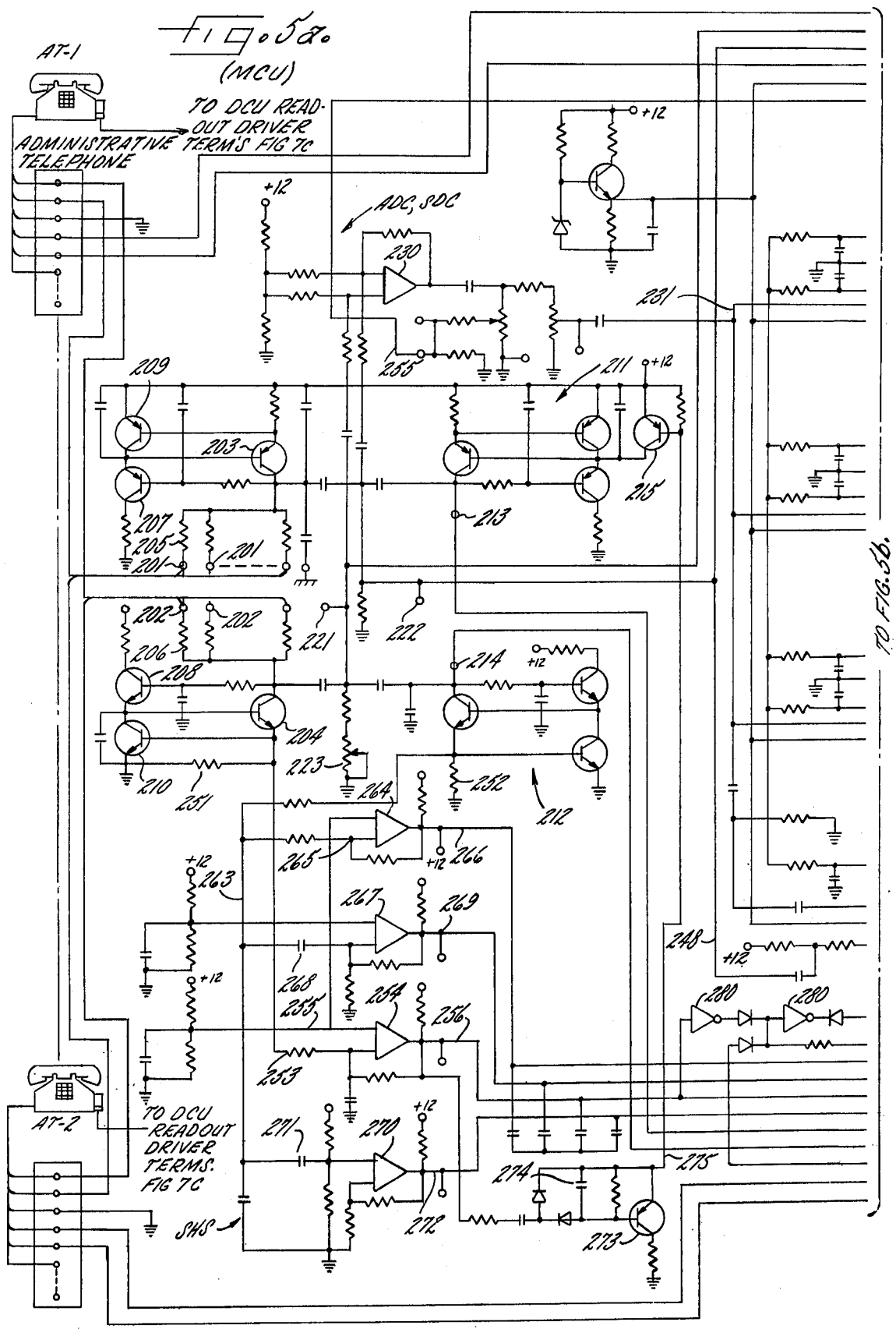

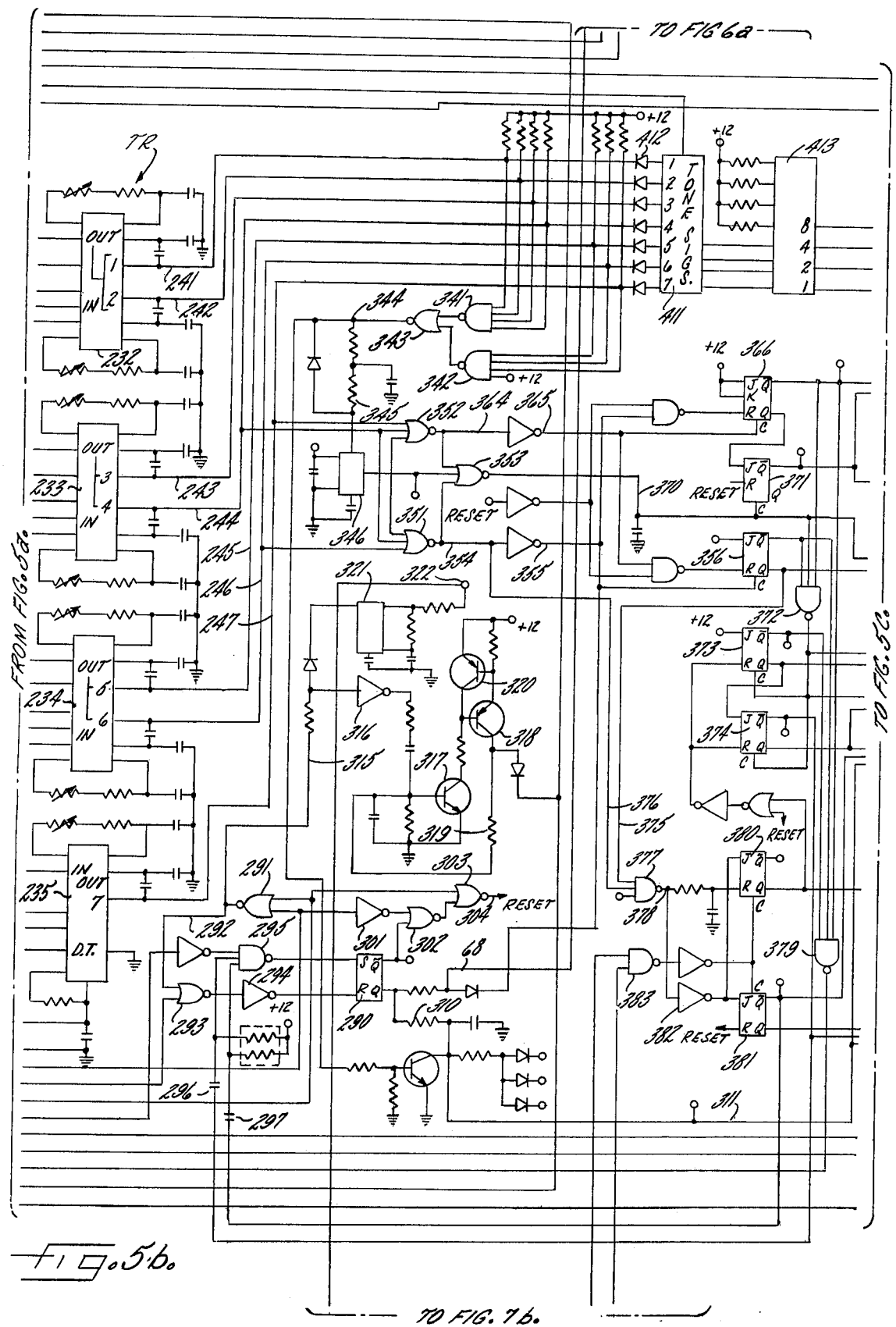

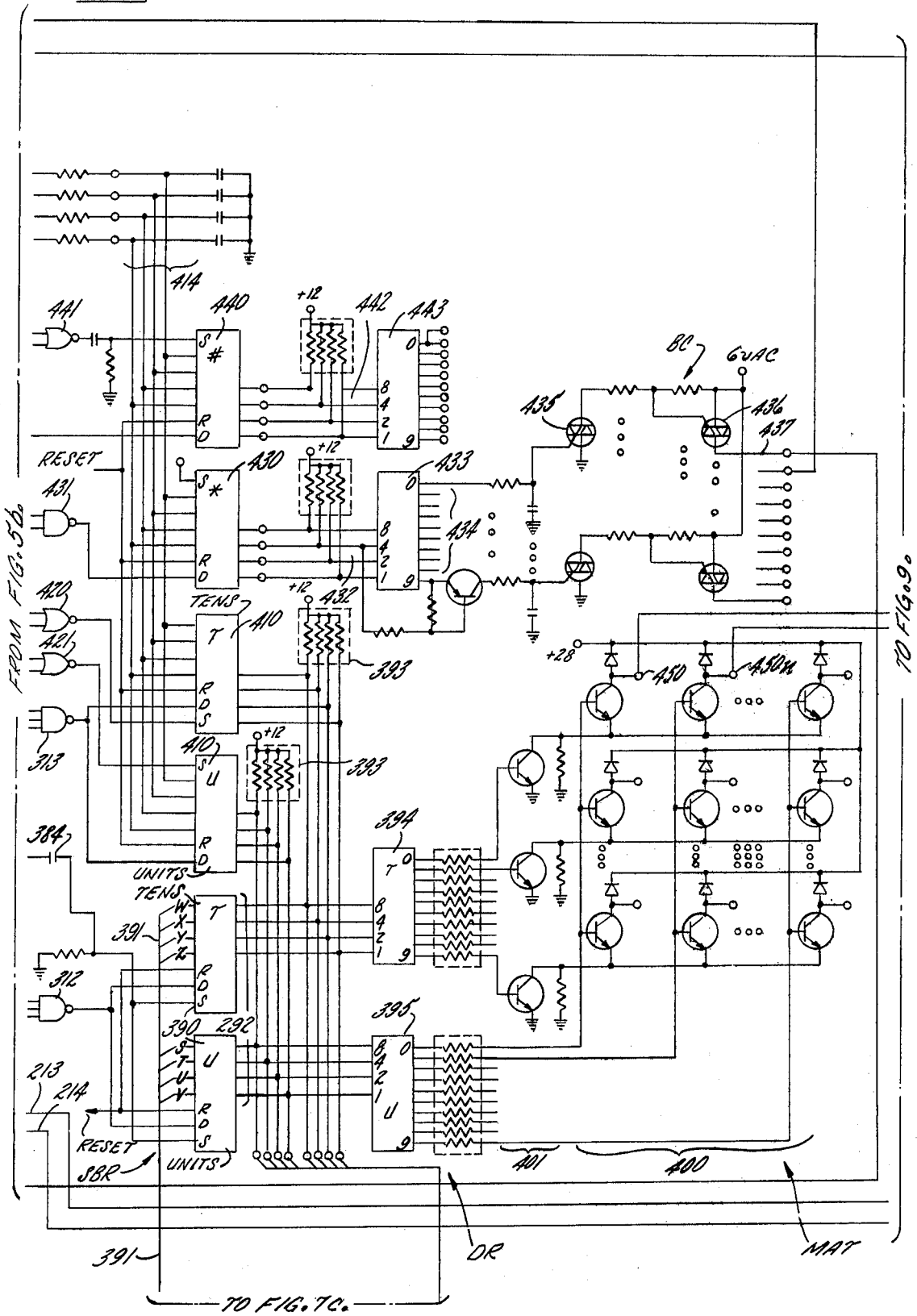

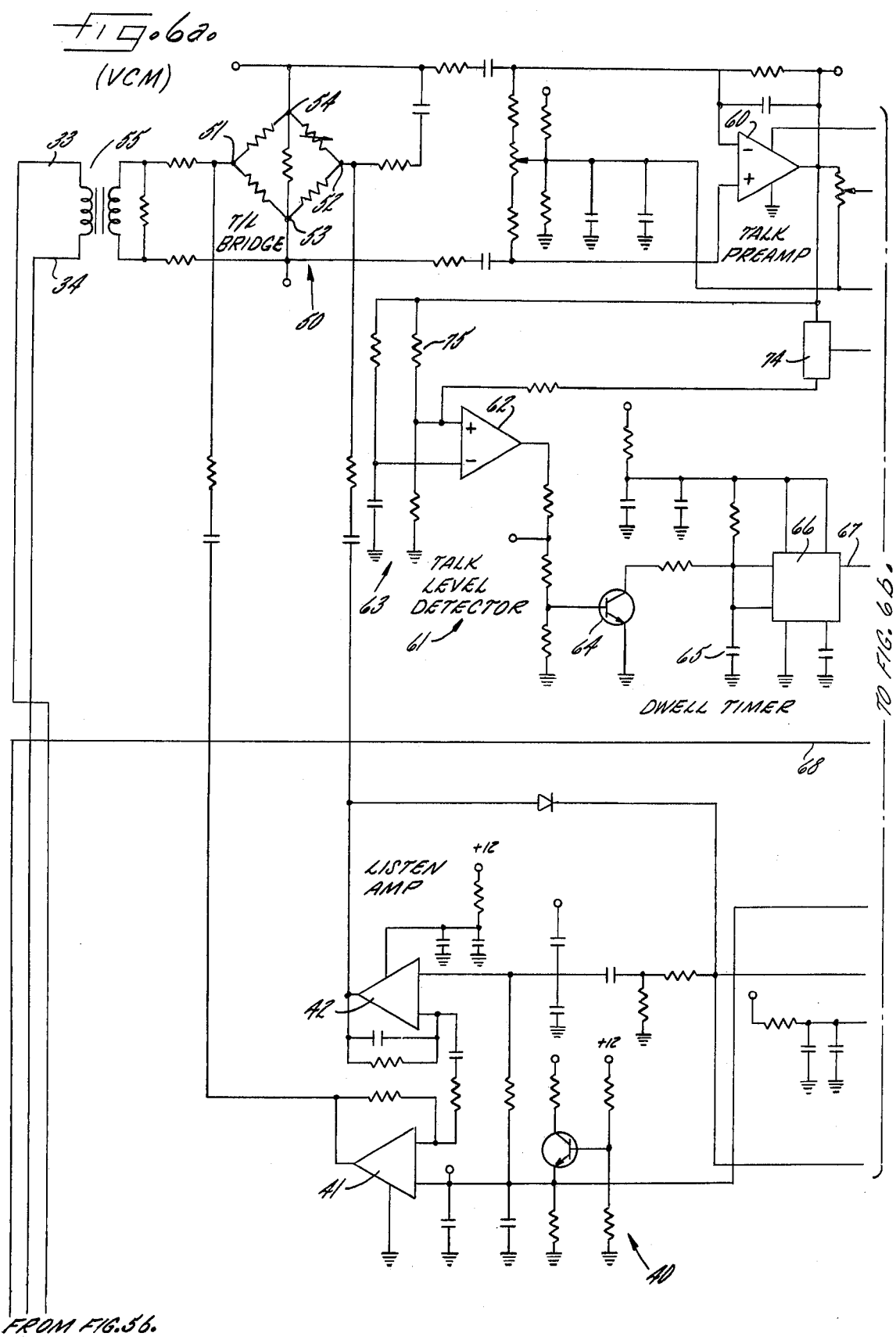

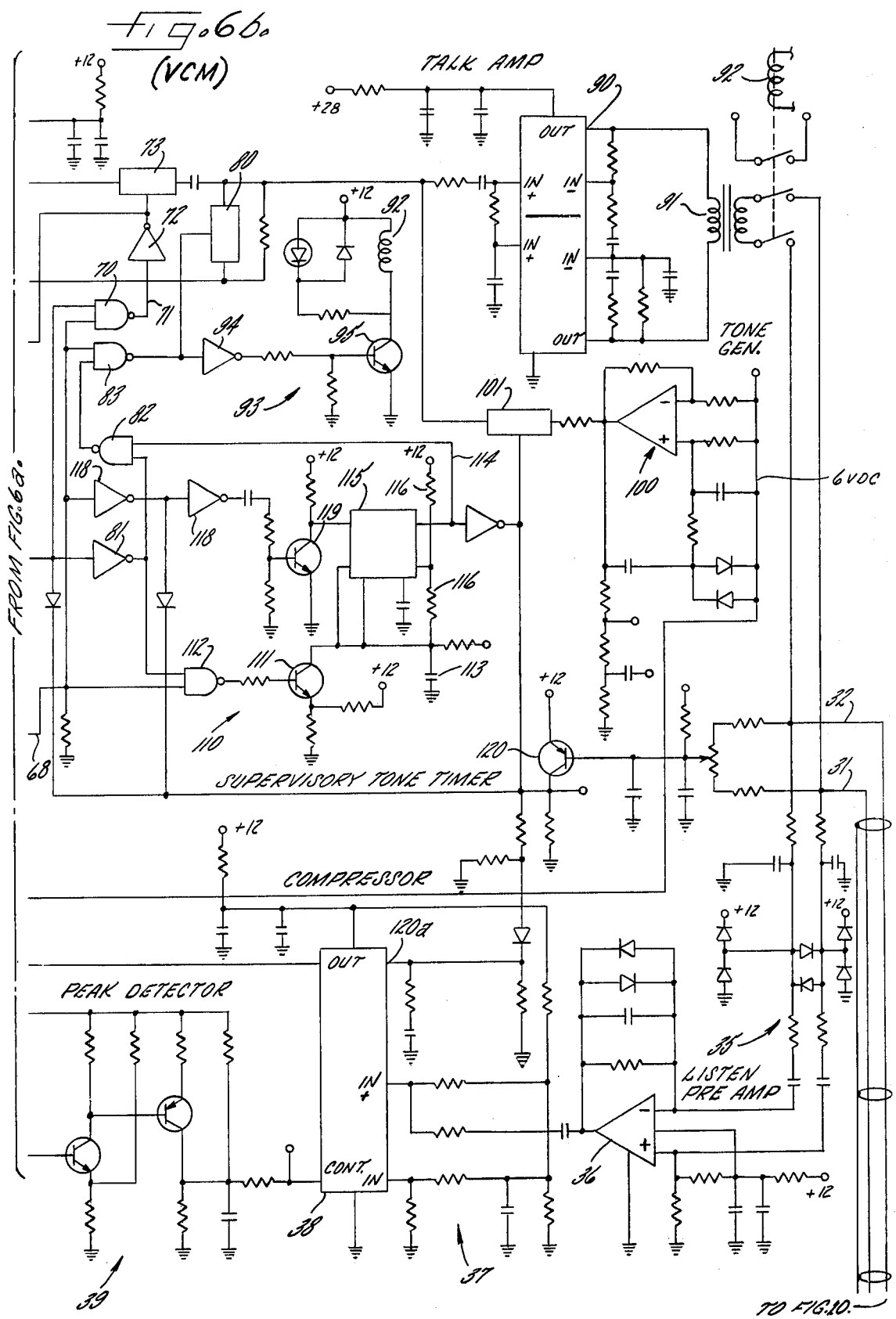

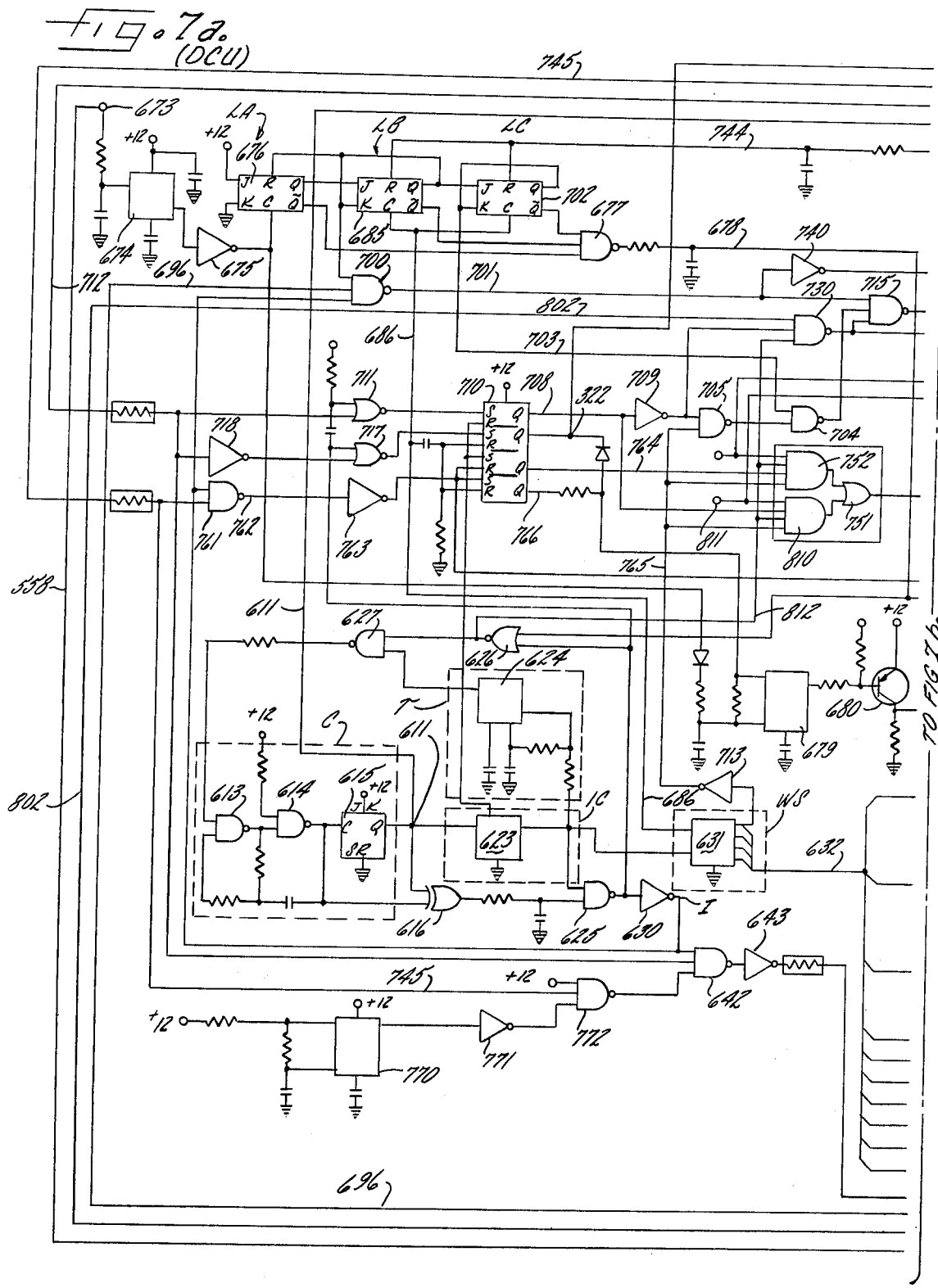

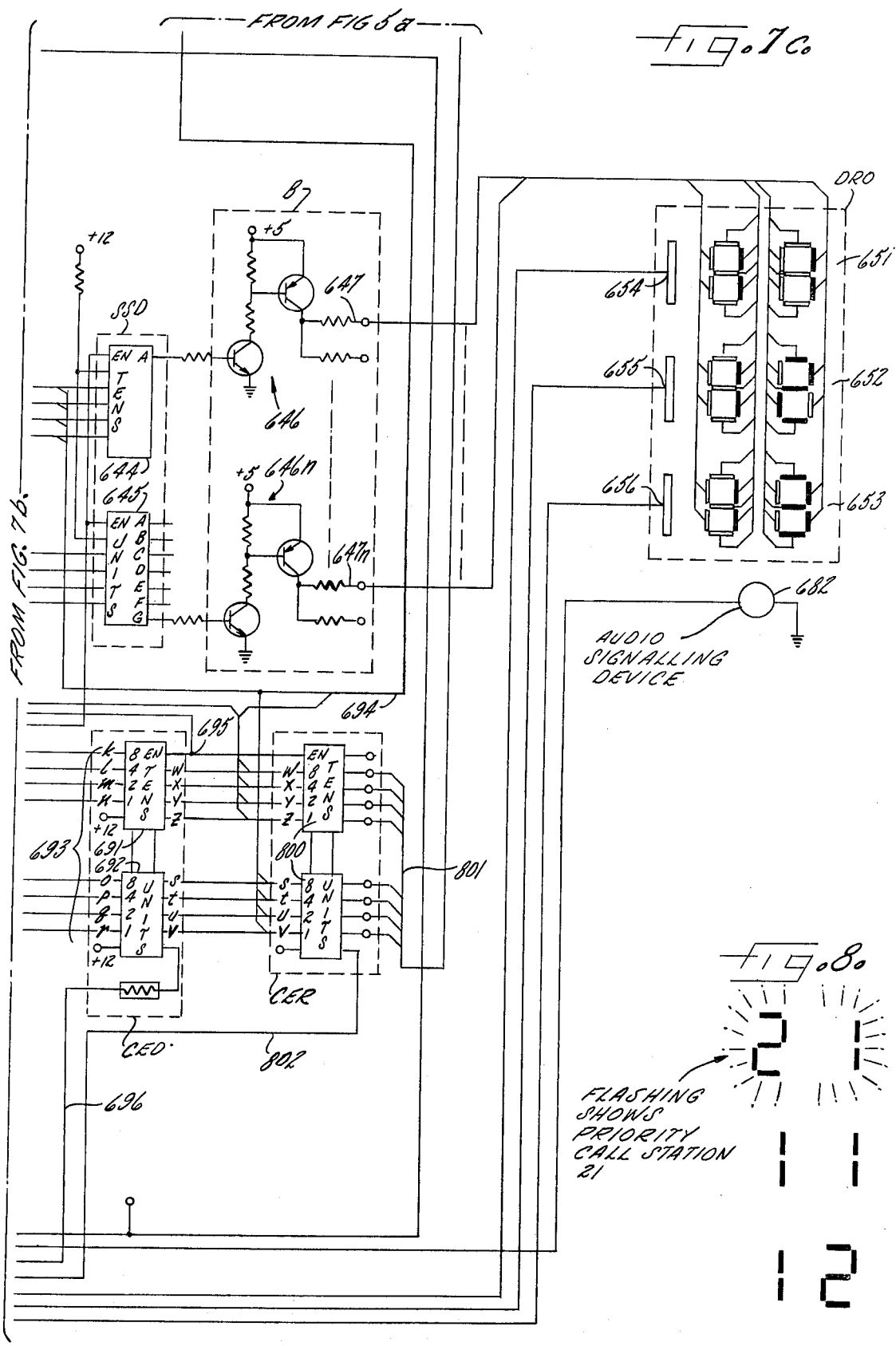

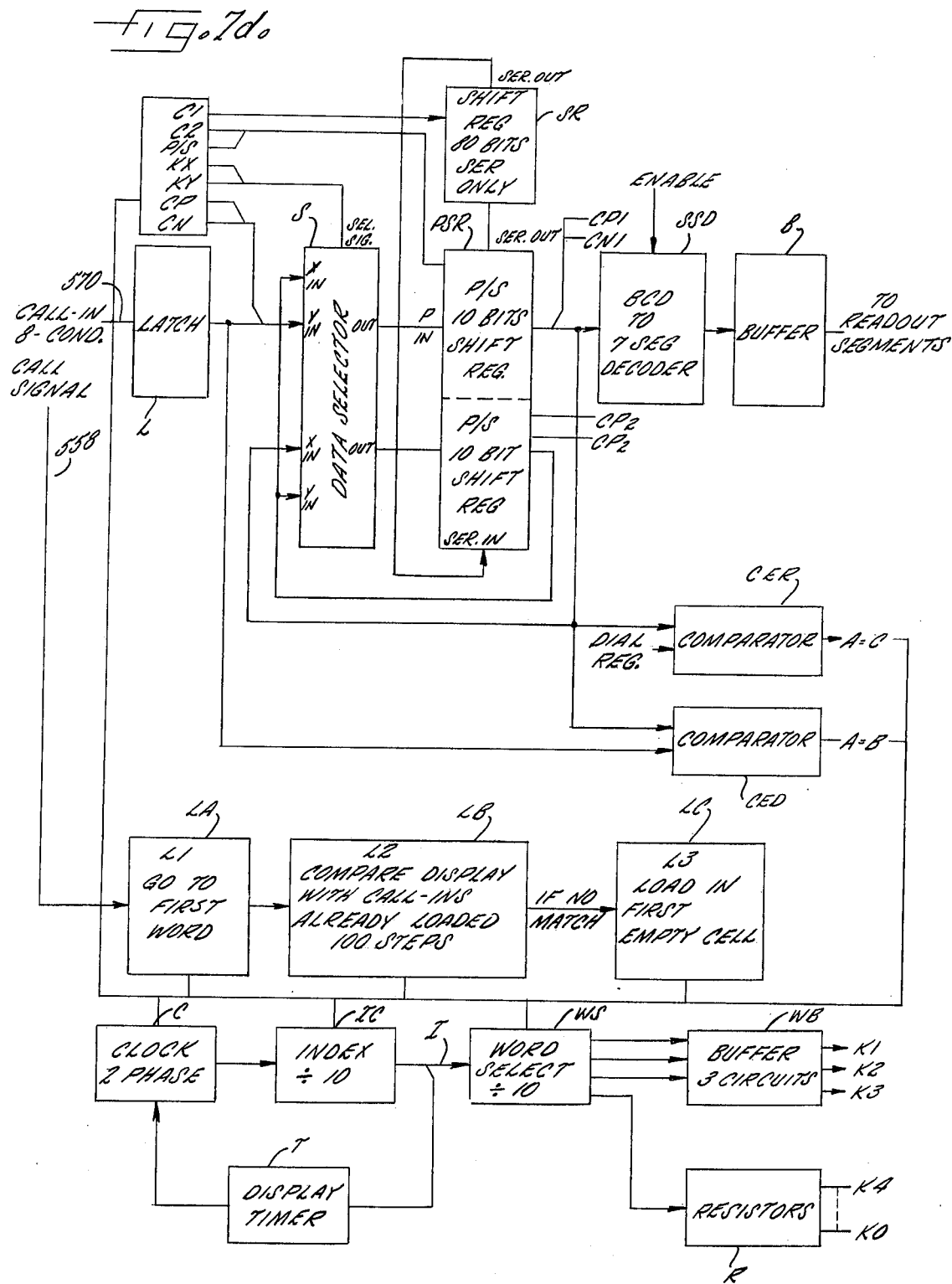

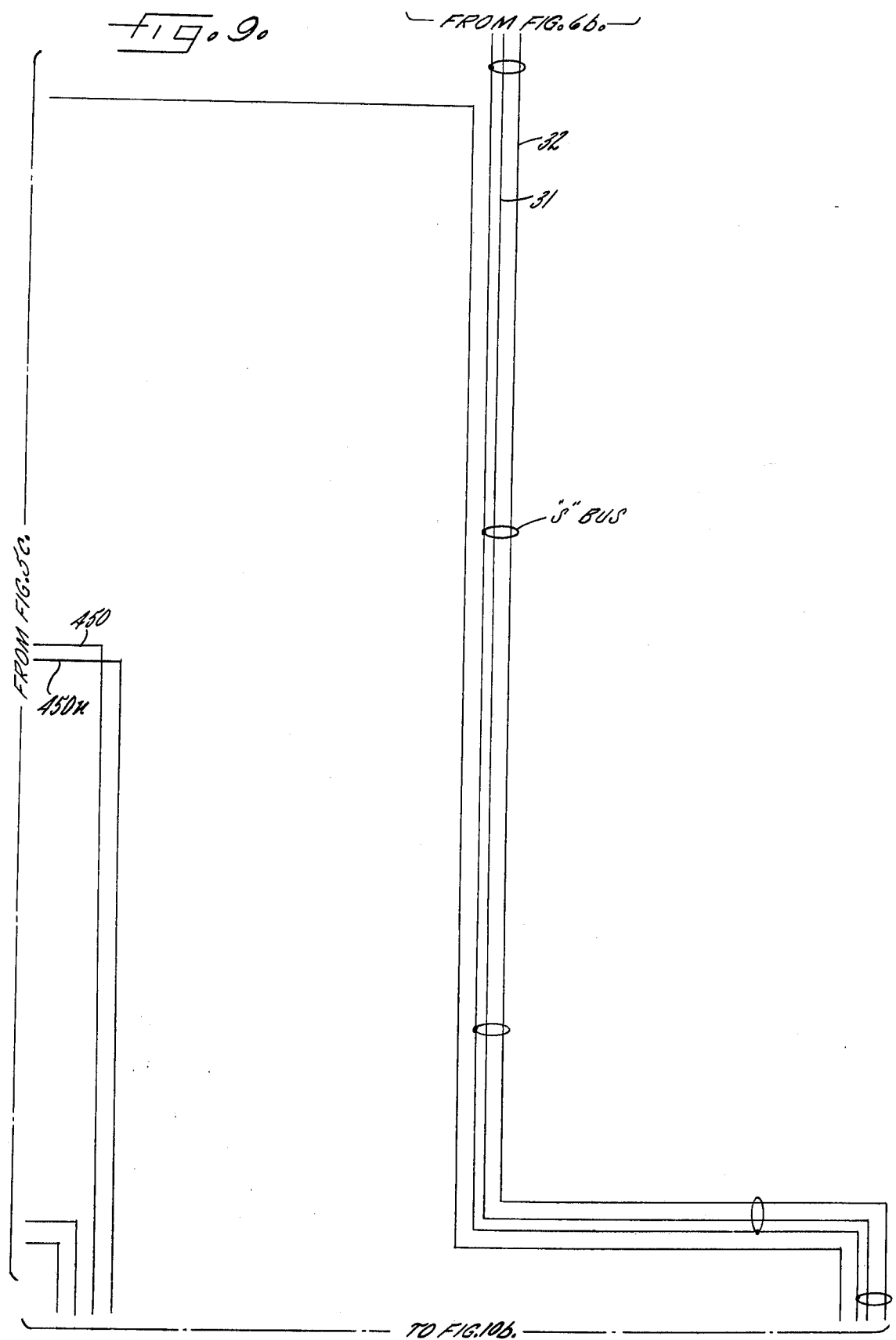

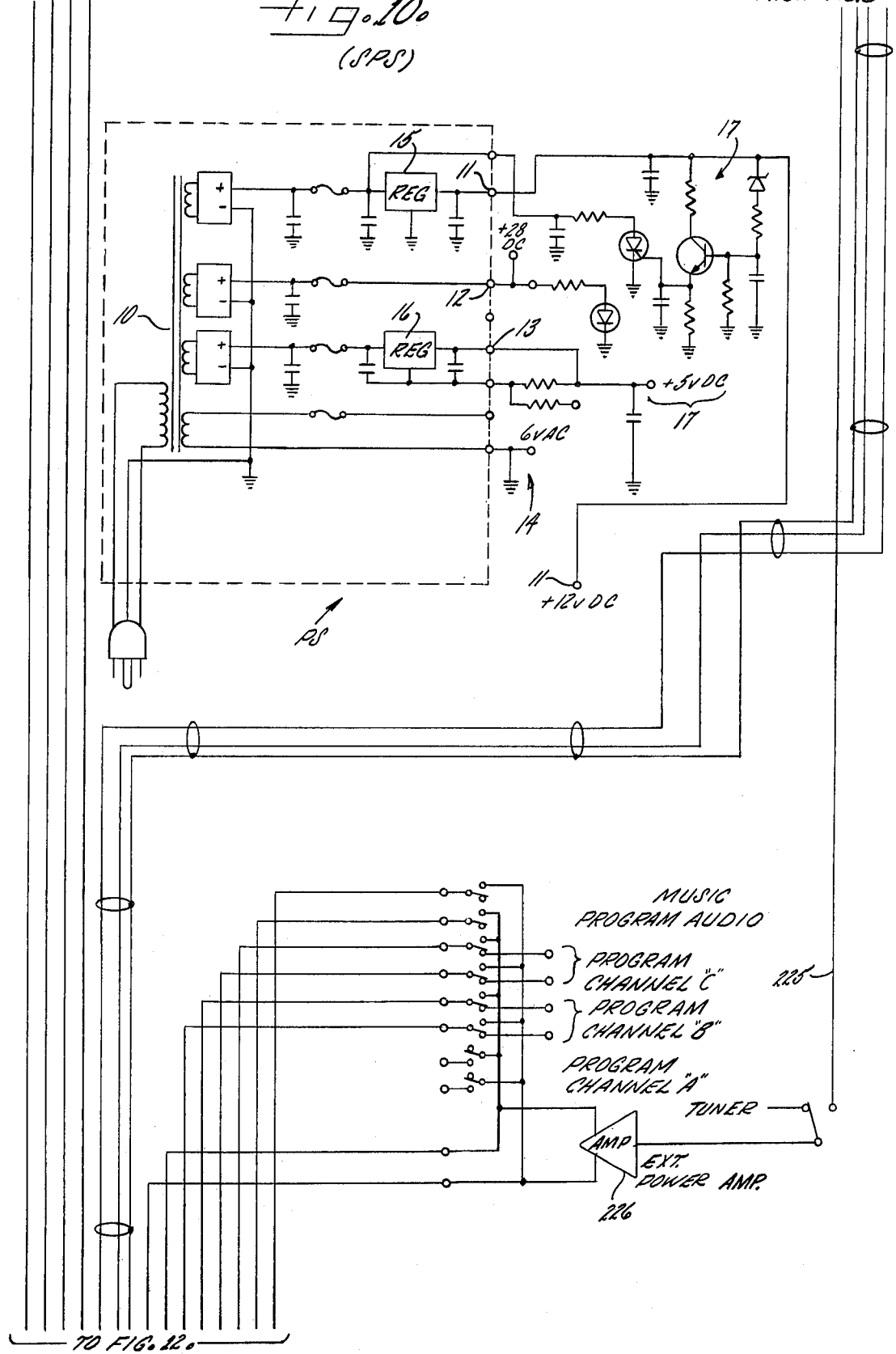

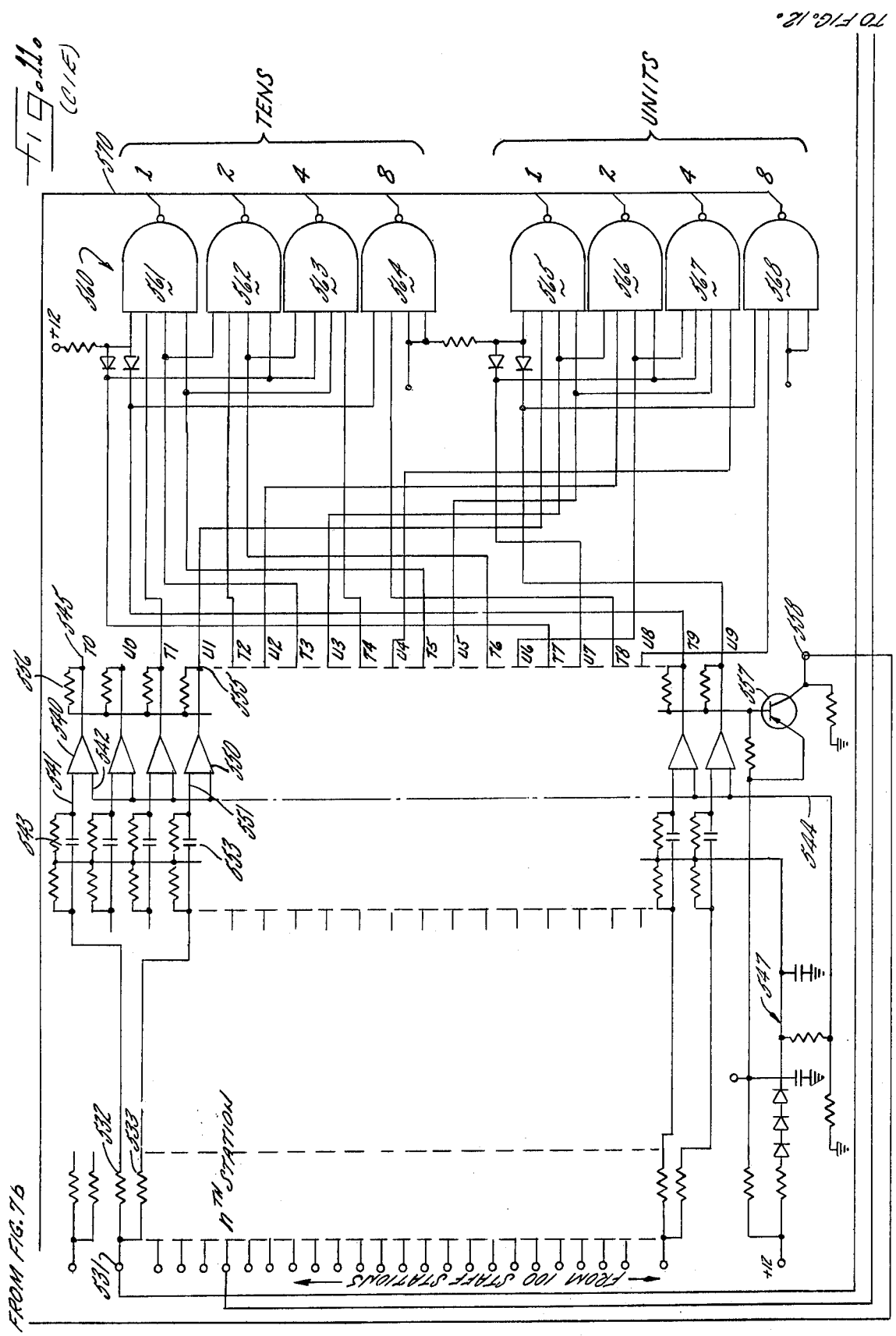

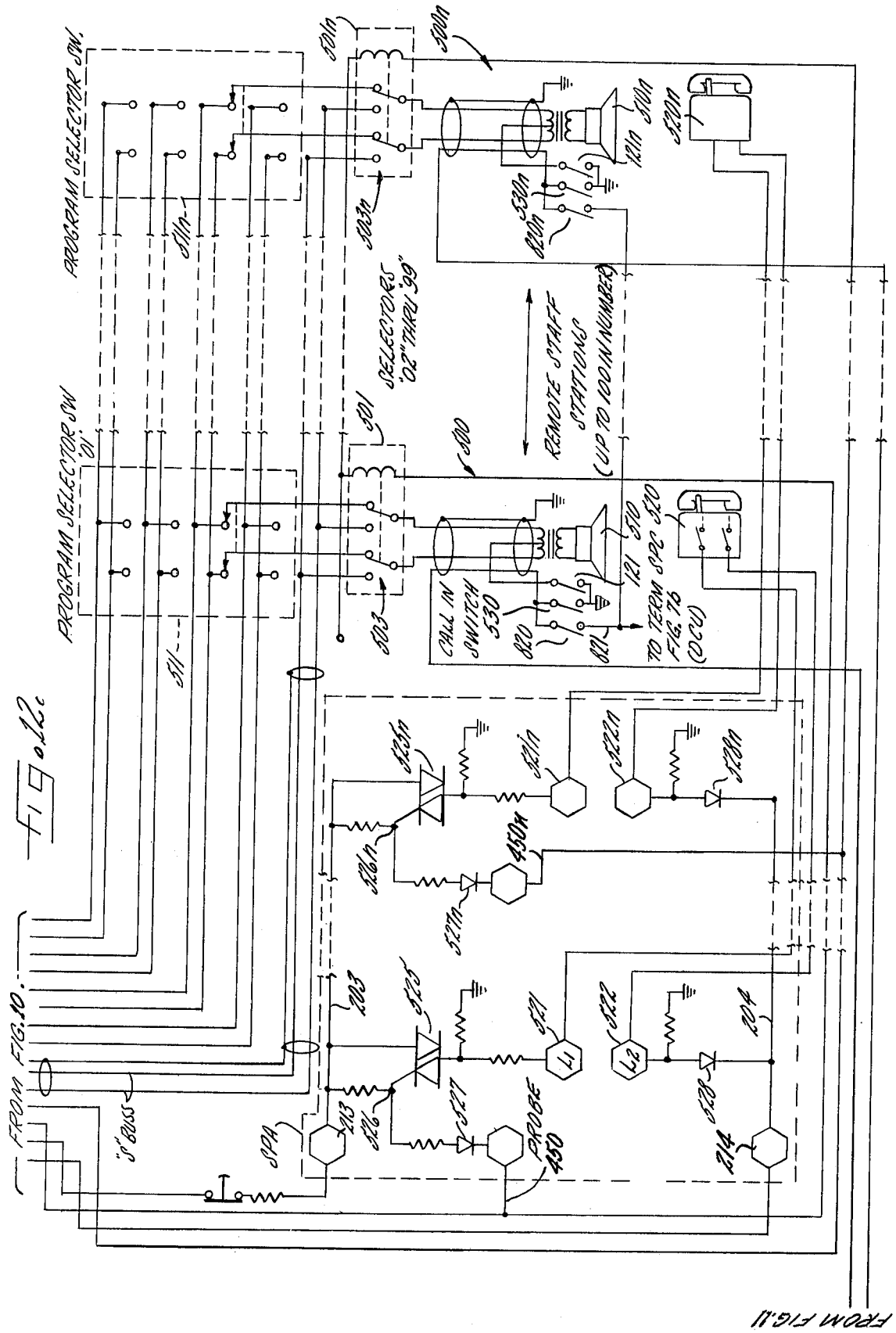

SUPERVISED SINGLE LINK TELEPHONE SYSTEM

In prior U.S. Pat. No. 3,809,824, which issued on May 7, 1974, an administrative telephone system is disclosed and claimed which has a plurality of links to enable a number of different conversations to be carried by the system simultaneously. It is an object of the present invention to provide a single link telephone system which is much more compact and economical than the system disclosed in the above patent while nevertheless providing additional operating features and advantages for the purpose of improving message handling speed, convenience, and effectiveness, with a high degree of administrative supervision. The system does not require the services of an operator and all switching and operating functions may be conveniently performed by the administrator without need for skill or experience.

It is a more specific object of the present invention to provide an administrative telephone system in which the remote, or staff telephone, stations calling in to the administrator are listed in digital form in a display column or "readout" associated with the administrative telephone set. Call-in is accomplished simply by pressing a call-in button at the staff position, after which the staff person may resume his normal routine with assurance that a voice connection will be established in due course. The administrator, by pressing a single button on the administrative telephone set, conveniently the "asterisk" button, connects the administrative telephone set to the staff telephone station shown in head position in the display column, the number in the head position being thereafter extinguished and with all of the remaining numbers in the column being advanced one step. Pressing the asterisk button again disconnects the first staff telephone station and connects the second. Each succeeding push of the asterisk button being effective to switch the administrative telephone set to the next telephone station listed in the display. Consequently, stacked calls can be handled in quick succession without necessity for hanging up the administrative telephone set between calls.

It is another object of the invention to provide means whereby any staff individual who has, by call-in, signaled his desire to communicate with the administrator, resulting in a listing of his telephone number on the administrator's display device, may, upon operation of a priority switch, establish priority, thereby moving the display of his telephone number to the head of the display column, and by causing such number to flash, while temporarily subordinating the other ones of the displayed numbers. In this connection it is an object to provide an administrative telephone system capable of accommodating a number of priority requests and with relative priority being established at the display device in the same order in which priority was requested. As a result of the priority feature, the system can be relied upon for the prompt reporting of emergencies of various kinds.

It is a more specific object of the present invention to provide an administrative telephone system in which the desire for communication with the administrator is registered, in one mode, by simply cycling the hook switch at the staff telephone station, a second cycling of the hook switch being sufficient to raise the call to priority status.

It is still another object of the present invention to provide an administrative telephone system in which a number of administrative telephone sets may be used having a push button dial pad including a button having an arbitrary symbol (*) and in which pressing such button on any one of the administrative telephone sets is capable of connecting the administrative telephone set to the first one of a series of stacked calls without necessity for dialing the number, or even knowing the number, of the particular staff telephone set. Nevertheless the administrator, regardless of the calls stacked in the storage and display devices, has full freedom, at any time, to dial any telephone station in the system.

It is another detailed object of the present invention to provide an administrative telephone system including a storage device in which a relatively long series of calls, in a practical case up to 10 calls, may be stacked, but in which the associated digital display device displays the numbers of only the initial calls in the series, with automatic advancement of the stacked calls into the display device as the calls are successively completed.

It is also an object of the invention to provide a single link telephone system which is highly flexible and which may be used for conference calls and for intercommunication between staff telephone stations but only under direct contact by the administrator.

It is yet another object of the invention to provide a system which, in addition to providing point-to-point communications, is readily adaptable to such auxiliary but important functions as the sending of time and alarm signals, paging or the making of announcements, and transmission of background music, broadcast throughout the entire system or on a more restricted, zonal basis.

It is a general object of the present invention to provide an administrative telephone system which may be used universally in schools, hospitals and similar institutions in which the equipment comprising the central exchange is highly compact, consisting of a power supply and as few as six printed circuit boards in closely stacked position all accommodated in a cabinet, or module, of standard panel width and measuring only about a foot in vertical dimesion. Consequently, the unit is easy to install and, unlike more conventional systems, can be located right in the administrative offices even under crowded conditions. Service, when necessary, is reduced, in most cases, to the plugging in of a new circuit board.

Because of the compactness and use of printed circuit boards, the central exchange, while electrically complex, is highly reliable and inherently economical, enabling pricing at a level which may be easily afforded by small schools and institutions.

Other objects and advantages of the invention will become apparent upon reading the attached detailed description and upon reference to the drawings in which:

FIG. 1 is a block diagram showing the components of a system constructed in accordance with the present invention.

FIG. 2 is a perspective view of an administrative telephone set having a digital display device mounted thereon showing the first three of a series of stacked calls.

FIG. 3 is a rear perspective view of the enclosure housing the system.

FIG. 4 is a chart showing how the figures in the 5 to 12 series are to be joined together.

Figure 7B:
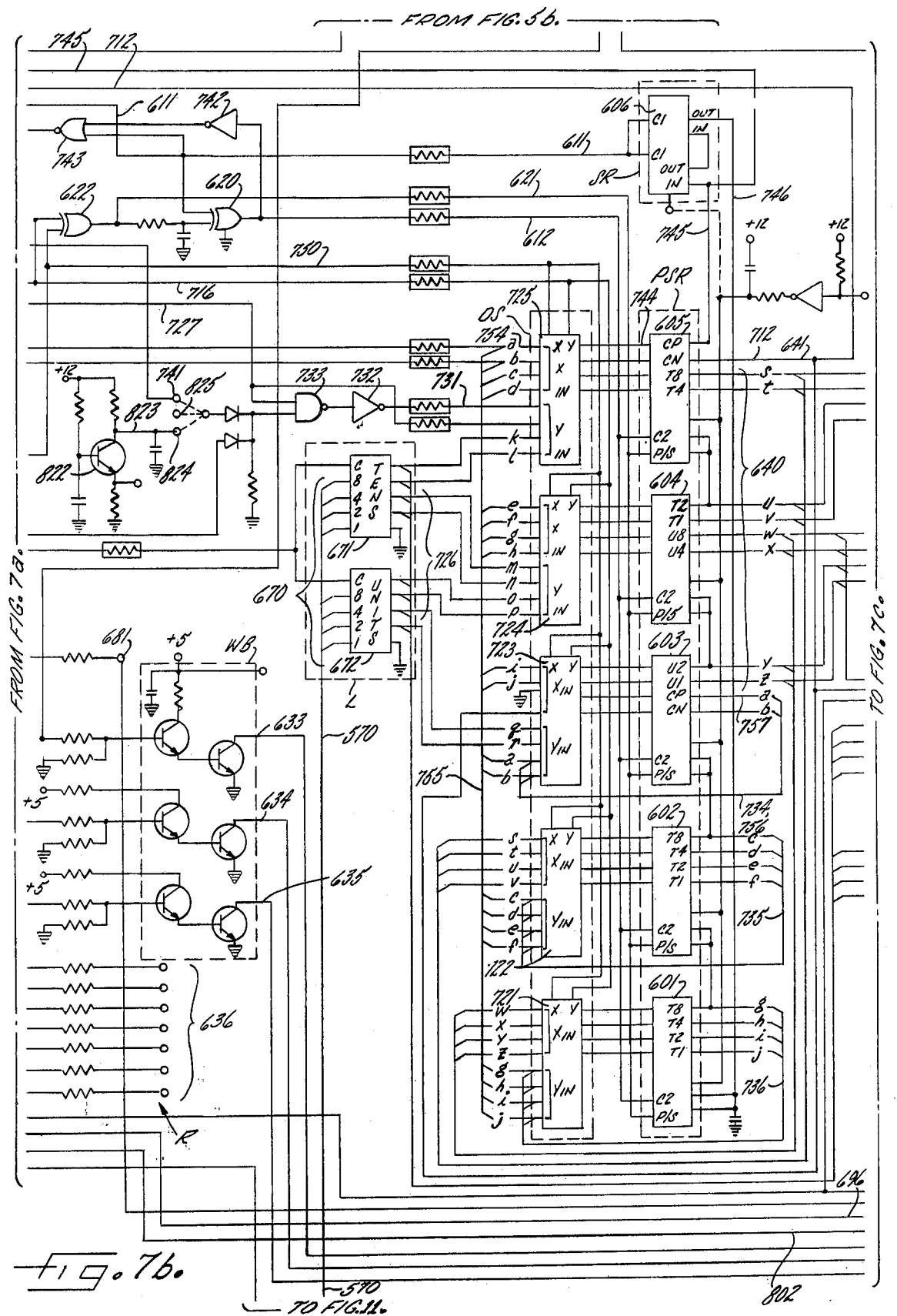

FIGS. 5a–5c together comprise the main control unit (MCU).

FIGS. 6a–6b together comprise the voice controlled amplifier module (VCM).

FIGS. 7a–7c together comprise the display control unit (DCU) including the display or digital readout device (DRO) and its associated connections.

FIG. 7d is a block diagram of the display control unit.

FIG. 8 shows the display device after one of the stations (21) has asserted priority.

FIG. 9 shows necessary interconnections.

FIG. 10 shows the system power supply module (SPS) in simplified form.

FIG. 11 shows the call-in encoder (CIE).

FIG. 12 is a schematic diagram of the staff phone adder module (SPA), program selector switches, and the speakers of the remote stations.

While the invention has been described in connection with a preferred embodiment, it will be understood that there is no intention to be limited to the preferred embodiment and that it is intended, on the contrary, to cover the various alternative and equivalent circuitry and construction included within the spirit and scope of the appended claims.

Turning now to FIGS. 1–3 of the drawings, FIG. 1 is a block diagram showing interconnection of the main components which make up the system. Such main components are housed in a central exchanger module CE as shown in FIG. 3 where it will be seen that the components are largely in the form of plug-in circuit boards in horizontally stacked relation. The central exchange is under the primary control of an administrative telephone AT (FIG. 2) having a dial pad D and a digital readout DRO to which further reference will be made. The dial pad is of the standard tone pushbutton type. A busy lamp BL and buzzer BU complete the assembly. It may be noted that one of the pushbuttons is designated by a first arbitary symbol in the form of an asterisk (*). As will be seen, it is one of the features of the present system that the asterisk button on the administrative telephone set may be pressed to select the leading one of a series of "stacked" incoming calls. The dial pad further includes a "number" pushbutton (#) which may be used to select special functions or options as will be discussed.

The main components of the system, housed in the central exchange CE (FIG. 3), include the following: First there is the power supply PS which provides necessary direct and alternating voltages. The voltages are distributed to the system via the top circuit board referred to as the System Power Supply or SPS. Arranged below the system power supply is the voice-controlled amplifier module VCM. Next in order is the main control unit MCU. A Call-In Encoder board CIE transmits call-in's to the Display Control Unit DCU. The lowermost board is the Staff Phone Adder SPA.

BRIEF DESCRIPTION OF SYSTEM OPERATION

In order to understand the detailed description which follows it will be helpful to have in mind the manner in which the system is intended to function and particularly the differences between this highly supervised system and a more conventional system. In a common form of intramural telephone system the central exchange is set up so that each telephone may directly dial another telephone in the system and several conversations may take place at the same time depending upon the number of "links" that are provided. Such a system, either partly or totally unsupervised, gives rise to problems when used in certain types of institutions such as schools were discipline and mis-use of the system may be a problem.

A typical system of the present type may include up to approximately six administrative telephones, with one main administrator's telephone (for example, in the principal's office) and with up to 100 staff telephone stations in the various remote rooms.

Each room may be provided, as a minimum, with a wall-mounted loudspeaker and call-in switch. It will be assumed in the discussion which follows that there is only one administrative telephone set, having visual display, and that the administrator at tht set is in supervisory control of the system.

When the administrator wishes to make an announcement to a particular room, or talk to the staff person in the room, he simply raises the receiver, listens for the dial tone and then dials the two digit number which identifies the particular station being called. This produces an attention-getting beep at the loudspeaker following which the administrator may make his announcement or carry on a conversation with the staff person in the room, with the loudspeaker serving both as a speaker and as a microphone. Amplification in the two directions is provided by a special reversible amplifier, and with the direction of amplification being controlled automatically by the voice of the administrator. When the conversation is at an end the administrator simply hangs up.

When a staff person wishes to discuss something with the administrator, he presses the call-in switch, which is conveniently in the form of a pushbutton. Actuation of the call-in switch causes the number of the calling station to appear, in illuminated form, at the head of the column of the digital readout DRO on the administrative telephone, accompanied by a buzz to attract the administrator's attention. When the administrator lifts his receiver he can complete a connection to the staff station, just as previously described, by pressing the station's identifying number on the dial. Alternatively, the administrator may connect himself to the call-in station by pressing the asterisk (*) button twice, a convenience referred to as single button dialing or SBD. A conversation then ensues and at the end of the conversation the administrator simply hangs up.

But suppose that two or more stations press their call-in buttons at about the same time. In such event the central station includes provision for registering the numbers of each of the call-in stations and storing such numbers in the order of call-in, the system having a capacity of storing, or stacking, up to a total of 10 call-in numbers with the first three of such numbers being displayed in the DRO. It will be understood that the display of three numbers is arbitrary and more numbers could be included in the display without departing from the invention.

It answering such a series of "stacked" calls, the administrator lifts his receiver and presses the asterisk button twice, which automatically connects him to the station whose number is listed at the head of the column. When the connection is made the number is automatically extinguished and all of the rest of the numbers in the storage register are advanced one step, bringing a new number to the head of the column.

When the first conversation is at an end, and the administrator is ready to talk to the station who is next in order, he presses the asterisk button once to connect him to that station, resulting in the number's being extinguished, and with the numbers of the remaining stacked calls, again, being moved up one step. Thus the administrator may be connected to a series of call-in stations by simple, repeated pushing of the asterisk button on his telephone until all of the call-ins have been answered, and without any necessity for hanging up between the calls. This enables a numerous stack of calls to be taken care of efficiently and in quick succession.

It is one of the further features of the invention that a station may, in an urgent or emergency situation, assign priority to his call-in. This is desirable in the event of a fire, or accident or, in the case of a school, a severe disciplinary problem. Assignment of priority is accomplished in one of two ways: by re-actuation of the call-in switch or by actuation of a separate, and adjacent, priority switch which may, if desired, by a type of switch requiring a key. In either event, the effect of adding priority to a normal call-in is to move the number of the priority station to the head of the column of stacked calls, overriding the rest of the stacked calls and temporarily subordinating them by moving them down one place in the storage and display column. The existence of priority is signaled to the administrator by the flashing of the number of the station requesting priority as well as by repeated intermittent beeping at the administrator's phone. Connection to a station requesting priority is accomplished in the same way as above: either by the dialing of the displayed digits or by a double pressing of the asterisk button. After the priority call-in has been answered, all of the subordinated stations move up one step, back to their original position in the stack, for orderly answering by the administrator. In the event that more than one station requests priority, which is a likely occurrence, for example, if smoke is smelled more or less simultaneously in a number of the rooms, all of the priority call-ins move to the top of the stack where they are listed in the order of assignment of priority, and with each priority number flashing to indicate its priority status. A series of priority call-ins are answered in the same way as a series of normal call-ins.

It will be understood, however, that even in the case of priority calls, the administrator is not limited to any particular order of answering. He can use his supervisory prerogative to dial his responses in any order he wishes.

In the above description of system operation it has been assumed that each station is equipped with only a loudspeaker and call-in switch. It is, however, one of the features of the present system that there may be associated with the loudspeaker a dialless telephone set thereby enabling the staff person to carry on a more private conversation with the administrator. Where a staff station includes a telephone set, lifting the receiver from the hook not only serves to direct the administrator's voice into the telephone set but the loudspeaker is automatically silenced.

Eavesdropping in the present system is avoided in two ways. In the first place when the loudspeaker is being used as a microphone in the "listen" mode, a periodic beep signals the staff person that the loudspeaker is listening in. Secondly, there may be included, as an option, with the call-in switch, a special switch setting which disables the loudspeaker, as a listening device, until such time as the switch is moved to its call-in position.

It is apparent that the administrator has complete supervision over all calls and, indeed, it is only through the administrator's intervention that two different staff telephone stations can be connected on one another. This is accomplished by calling the first staff phone, then cycling the cradle switch once to get dial tone, and then calling the second staff phone. A three way conference then exists until the administrator hangs up, leaving the two staff phones in communication until they decide to hang up. (Once hung up, a staff phone becomes inactive or "dead" until called again by an administrative phone.)

The system as discussed has assumed the existence of a single administrative telephone having visual display. However, it is one of the features of the system that a number of administrative telephone sets may be provided each equipped with a buzzer and busy light but not equipped with a display device. Thus where a call-in is not taken by the main administrative telephone, a person at any one of the other administrative telephone sets may take the call by utilizing the single button dialing feature, in other words, by simply lifting the receiver and pressing the asterisk botton twice. Where a plurality of administrative telephone sets are provided, one administrative telephone may dial any one of the other administrative telephones simply by pressing the asterisk followed by the pressing of the single digit which identifies the particular telephone being called.

The system has been described above as providing person-to-person communication. However, it will be understood that the system may be utilized in other modes and with other program material. Other program sources include background music, time signals, paging and general announcements, signals to denote the beginning and ending of a class period, emergency signals, and the like, either on an "all system" basis or an a "zonal" basis with the information being received at selected ones of the rooms under the control of a switch panel, or patch panel.

DETAILED DESCRIPTION

System Power Supply or SPS

The system power supply, which includes the power supply subassembly PS, is illustrated in FIGS. 9a and 9b. The system is powered from the 110 volt AC supply line via a transformer 10, the current being rectified and filtered to provide a 12 volt DC output 11, a 28 volt DC output 12, and a 5 volt DC output 13. A fourth output 14 is at the level of 6 volts AC. Voltage regulation is provided by IC devices 15, 16. At the output of the 12 volt supply is an over voltage protection circuit 17.

Voice-Controlled Amplifier Module or VCM

For two-way communication, this module achieves amplification in two directions, with the direction of amplification being controlled by the voice signal from the administrative telephone AT. The module has a first or right-hand pair of terminals 31, 32 forming a so-called "S" bus selectively coupled to the speaker at a staff telephone station and a second or left-hand pair of terminals 33, 34 coupled to the administrative telephone. When the system is in the "listen" mode (from the point of view of the administrative telephone), the terminals 31, 32 act as input terminals for amplifying the signal picked up by the loudspeaker at the staff position.

The signal passes first through a linear network 35 feeding a "listen" preamplifier 36. The output of the preamplifier is fed to a compressor circuit 37 which includes an IC device 38. The IC device has an associated peak detector circuit 39. The peak detector responds to peak levels of signal thereby varying the gain of the IC device 38 so as to maintain a substantially constant signal level.

From the compressor the signal is fed to an amplifier 40 having IC devices 41, 42 providing a balanced output.

The signal from the output of the amplifier 40 is applied to a balanced bridge 50 having a first pair of terminals 51, 52 and a second pair of terminals 53, 54 at right angles thereto. The terminals 51, 53, which span only one-half of the bridge circuit, are coupled to the terminals 33, 34 via a transformer, such terminals in the "listen" mode, serving as output terminals for the module. Since the bridge is balanced, the signal arriving at terminals 51, 52 produces substantially no signal across terminals 53, 54 which supply the reverse or "talk" channel.

In short, as long as the administrator is not speaking, the remote speaker serves as a microphone and the module amplifies, without any interference, in the speaker-to-phone direction.

However, in the "talk" mode, when the administrator is speaking, the voice signal appearing at terminals 33, 34 is applied across only one-half of the bridge, between terminals 51, 53. This in turn results in an unbalanced signal across bridge terminals 53, 54 which is applied to the input terminals of "talk" preamplifier 60. The output of the preamplifier is fed into a talk level detector circuit 61 including a balanced IC device 62 which serves as a comparator. The talk level detector circuit includes a voltage reference 63. Thus when the administrator's voice appears on the line at a high enough level to achieve a peak value at the comparator 62, the comparator becomes unbalanced, turning on transistor 64 which is shunted across a timing capacitor 65. Associated with the timing capacitor is a switch 66 in the form of an IC device having an output terminal 67 on which the voltage is high during the "talk" mode. For the purpose of "enabling" the voltage on line 67 to accomplish its function of reversing the direction of amplification, a "VCM activate" voltage is fed to the VCM device via a line 68 from the control logic, as will be discussed. Thus the presence of high control voltage on lines 67 and 68, applied to gate 70, turns such gate "on", causing the gate output at 71 to go to zero. Zero voltage is inverted by inverter 72 to present a high turn-on voltage to a switch 73 as well as to a switch 74. Turning on switch 73 permits the talk signal to pass. Turning on of the switch 74 short-circuits a resistor 75 interposed between the talk preamplifier and the comparator, thereby lowering the threshold of the talk level detector circuit 61. In short, a voice peak is required to activate the talk circuit but, once the circuit is activated, resulting in closure of the switch 74, the talk circuit is responsive even to low signal levels.

In order to insure that no signal gets into the talk amplifier chain during the listen mode, a normally closed shunting switch 80 is provided. Such switch is under the control of inverting gate 81 and "nand" gates 82, 83. Thus under "talk" conditions, when a high voltage exists at the input of gate 81, a low voltage exists at its output and at the corresponding terminal of gate 82, producing a high voltage at its output and at the corresponding terminal of gate 83. With the VCM activate signal in effect, a low voltage is applied to the control terminal of the switch 80 thereby opening the shunt and permitting the talk signal to come through.

The talk signal is next applied to a power or "talk" amplifier 90 which is coupled by a transformer 91 to lines 31, 32 which, during the talk mode, comprise the output.

For the complete disconnection of the power amplifier from the lines during the listen mode, when the speaker is being used as a microphone, a disconnect relay 92 is provided. To energize the relay under "talk" conditions, and to complete a talk connection, a relay control circuit 93 is used made up of an inverting gate 94 and a transistor 95. Gate 94 is controlled by the same signal that controls the switch 80, so that when the switch 80 is open, allowing the voice signal to pass through the talk circuit, the transistor 95 is turned on energizing the coil of relay 92 thereby closing the relay contacts and connecting the transformer winding to terminals 31, 32.

For the purpose of producing a periodic "beep" at the loudspeaker at the staff position in the listen mode, means are provided for generating a tone and for applying the tone periodically to the talk amplifier. The tone is generated by an oscillator 100 having a switch 101 interposed between the oscillator and the talk amplifier. For turning on the switch a timing circuit 110 is provided. The timing circuit includes a transistor 111 which is turned on, by gate 112, as long as a talk signal exists, thereby discharging a capacitor 113 at its output. However, in the "listen" mode, when the "beep" signal is desired, and when the voltage at 67 is low, the capacitor 113 is allowed to charge through a resistor 114. When the capacitor 113 charges to a threshold value, it triggers a tone timer 115, turning on the switch 101 to initiate the "beep" signal, the duration of the signal being dependent upon the value of a resistor 116. The initial beep is triggered by a transistor 117 under the control of inverting gates 118.

During the time that the beep signal is "on", means are provided for opening the shunting switch 80. This is accomplished by a line 119 connected to one of the input terminals of gate 82 which controls the switch 80.

The VCM also has a transistor 120 having its input connected to the DC input/output biasing circuitry leading to the staff speaker station (500 in FIG. 12). As will be seen such station may be equipped with a switch 121 that upon closure causes this transistor to turn on, thus transmitting a high level signal to a muting terminal on the compressor chip, 38. This prevents an administrator from listening to a staff station whose privacy switches on, but still allows him to talk to the station.

To summarize: The VCM is a reversible amplifier, normally feeding, in the "listen" mode, from right to left but with a "talk" signal, entering from the left, being capable of turning on the talk amplifying circuit to produce amplified output at the right-hand terminals 31, 32.

The catalog designations of key VCM components are as follows, the numbers in parentheses setting forth the numbers of the pins on the device to which connection is made (clockwise from upper right-hand corner) except for power supply connections and with the "run-together" numbers denoting common connections.

| IC | Type and Function | Component | Terminal Numbers (Clockwise) |
|---|---|---|---|
| 741 | op. amp. | 36 | (2 7 3 4 6) |
| 741 | op. amp. | 60 | (6 4 3 2 7) |
| LM 378 | op. amp. | 90 | (13 8 7 2 3.4.5.10.11.12 6.1 9 14) |
| 556 | dual timer | 66 | (5 3 7 6 4 14) |
|  |  | 114 | (9 7 11 8 12 10) |
| 4016 | quad sw. | 73 | (9 6 8) |
|  |  | 74 | (12 10 11) |
|  |  | 80 | (1 13 2) |
|  |  | 101 | (4 5 3) |
| LM 370 | compr. amp. | 38 | (6 1 2 7 4 3 11 14) |
| RC 4136 | quad. amp. | 41 | (6 5 7 4) |
|  |  | 42 | (2 1 3 11) |
|  |  | 62 | (10 8 9) |
|  |  | 100 | (14 13 12) |

Main Control Unit Module or MCU

Reference will next be made to the main control unit which performs a number of interrelated functions. The circuits of the main control unit will be explained but attention may first logically be given to the terminals or connections between this unit and the other units of the system.

Referring to the left-hand side of the circuit diagram, FIG. 5a, terminals are provided for connection to the administrative telephone while other terminals are connected to the staff telephone stations via the staff phone adder, FIG. 12.

Turning next to the "output" of the MCU unit shown at the right-hand side of FIG. 5c, a plurality of transistors, 100 in number, for a capacity of 100 staff stations, control corresponding relays to which reference will later be made in connection with the SPA unit, FIG. 11. The main control unit also has inputs, for example, from the DCU, for "single button dialing", a feature which enables the administrator to connect himself with any calling staff station by pressing the single asterisk button on his telephone set. The circuit as will be seen, also includes timing signals from the DCU. Means are also provided at the right hand side of FIG. 5c for controlling 10 buzzer outputs for a total capacity of 10 administrative telephone sets.

Output terminals are provided, going to the DCU, for causing cancellation of the storage and display of an incoming call once that call has been answered by an administrative telephone.

With the above functions in mind, attention will first be given to the administrative telephone circuits shown at the left-hand side of FIG. 5a. The administrative telephones AT are connected effectively in parallel to terminals 201, 202, each of the terminals being in multiple. Current is supplied to the terminals 201, 202 through power transistors 203, 204 respectively having current sharing resistors 205, 206. The power transistors 203, 204 perform a number of functions. They provide a fairly constant DC output voltage for energizing the administrative telephone sets; they provide a high impedance to AC so as to avoid loading the audio circuitry; and they provide short circuit protection. To achieve the high AC impedance, bias for the power transistors is derived from control transistors 207, 208, while short circuit current limiting is provided by transistors 209, 210.

Substantially identical power transistor and control circuitry is used to furnish current to the staff telephone stations via the SPA board, the transistor circuitry being indicated at 211, 212. The transistor circuitry feeds terminals 213, 214 which are connected to lines which lead to correspondingly numbered supply terminals of the SPA boards (FIG. 12). An auxiliary transistor 215 is provided for enabling the administrator to cut off talk power to a staff phone that the administrator wishes to disconnect, for example, a staff telephone which is called after being inadvertently left off the hook.

The audio signals from the administrative telephone and staff telephone station are coupled through capacitors to balanced talk "nodes" 221, 222, with the impedance being balanced by a variable resistor 223. The nodes 221, 222 are also the point of communication between the telephone talk circuits and the VCM previously discussed.

Connected to the node terminals 221, 222 is an amplifier 230 which serves to convert the balanced input to single line output for the purpose of supplying audio to the bus furnishing a series of phased lock loop, or PLL, circuits as well as to provide an audio signal to line 225 for an amplifier 226 (FIG. 10) which is used for "all station" calling. The bus feeding the PLL circuits is indicated at 231. Connected to the bus 231 are four dual IC devices 232, 233, 234, 235 which include a total of seven phased locked loop frequency selective tone decoders plus an oscillator for providing a dial tone to make a total of eight circuits.

Connected at the output of the tone decoder circuits are a series of coded lines 241-247. The circuitry is such that the dialing of any digit at the administrative telephone causes a signal to appear on two out of a total of seven lines, such signal being in the form of a "low" on the two lines. The output from the audio oscillator, in unit 235, which furnishes the dial tone, occurs on line 248.

For the purpose of sensing talk current thereby to signal that a telephone is off-hook, current sensing resistors 251, 252 are respectively provided in the power supply for the administrative and staff telephones. The voltage drop across the administrative series resistor 251 is applied to line 253. The line 253 feeds into a comparator 254 having a reference voltage supply line 255, the circuit being such that when one or more of the administrative telephones is off-hook, a high voltage appears at an output line 256.

Turning next to the detector resistor 252 which responds to a staff telephone going off-hook, the resistor has an output line 263 connected to a comparator 264. The comparator 264 has a line 265 for application of reference voltage. Thus when one or more of the staff telephones are off-hook a high is observed at the output line 266 of the comparator.

Not only is the fact that a staff telephone has gone off-hook sensed by the comparator 264, but means are also provided for signalling whether an additional staff telephone has added or removed from the circuit, in other words sensing changes in the hook status of the staff telephones. Thus, for the purpose of detecting when a telephone has been added, a comparator 267 is provided which is coupled to line 263 via a capacitor 268. A positive-going pulse transmitted by the capacitor 268 causes a high signal to show up at the comparator output line 269. Conversely, for detecting when a staff telephone goes on-hook, a comparator 270 is provided having a coupling capacitor 271 which produces a high on output line 272 in response to a negative going signal flowing through the capacitor. In short, when a staff telephone goes off-hook a pulse signal appears at line 269, whereas when a staff telephone goes on-hook a pulse signal appears at line 272.

Mention has previously been made of transistor 213 which serves to disable the staff supply. Such transistor is controlled by a transistor 273, the input of which is connected to the administrative hold line 256 through diodes and capacitors so that each time the hook switch of an administrative telephone is "jiggled" additional voltage builds up across a capacitor 274 eventually turning on the transistor 273, which, via a line 275, turns on the disabling transistor 215. The administrative hold signal appearing on line 256 is also fed through a series of inverter gates 280 to inhibit the dial tone produced by the IC circuit 235 when the administrative telephone in hung up.

To summarize the above, the outputs of the comparators appear on four lines namely the administrative telephone hold line 256, the staff telephone hold line 266, the staff off-hook pulse line 269 and the staff on-hook line 272. The information provided by these four lines is fed into a logic network for accomplishing a number of different functions including (1) reset for resetting all of the system registers and flip-flops, (2) control of the IC mode, (3) control of busy lamps on the administrative telephones and (4) control of the relay holding matrix. Turning first to the control of the IC mode, a flip-flop 290 is provided with means for holding it in an "off" condition as a result of signals received from the administrative and staff telephone hold lines 256 and 266, the information appearing at the input of gate 291. The latter has an output line 292 which controls a gate 293 and an inverting gate 294, which is connected to the flip-flop, 290 reset terminal. Therefore, when one of the system phones is off-hook, one of the hold signals on the gate, 291, will be high causing the resetting signal to be removed from the flip-flop, making it receptive to a turn-on signal. The turn-on signal for the flip-flop is supplied by a gate 295 which responds to a signal appearing on one of three input terminals. Two of the input terminals receive their signals through capacitors 296, 297, respectively. A signal on capacitor 296 indicates that the units digit has been dialed into the system register (completion of dialing). The second capacitor 297 receives a signal in response to the pressing of the single button dialing tone. The third way that the gate 295 can be set is through a signal received from line 272, indicating that a staff telephone has gone on-hook. Additionally it should be noted that the flip-flop can be reset by a staff telephone going off-hook, the signal being transmitted through gate 293 and inverting gate 294. In other words, the intercom mode flip-flop, 290, which enables and disables phone-to-speaker, or intercom, communication is turned on whenever one finishes dialing a call to a staff station by dialing 2 digits or by SBD. It is also turned on when while talking to a staff phone; one hangs up signaling the desire to change over to the staff speaker for continuing communication. The flip-flop is reset when a staff phone goes off hook, indicating a desire for private (phone type) communication.

Turning next to the general reset function, it is obtained from the administrative hold and staff hold signals appearing at lines 256, 266 and also the inverse of the intercom hold signal from the flip-flop 290, the signals being processed by the three gates 301, 302, 303. This results in a reset signal appearing at terminal 304 whenever administrative phones are all hung up—but not if the system is in intercom mode & a staff phone is off hook. In the latter case, when a staff phone is talking to a staff speaker, reset will not occur until the staff phone also hangs up. The reset signal is utilized to restore all registers & flip-flops to an initial or idle condition. The output of the intercom mode flip-flop 290 is also fed through a resistor 310 via a line 311 to the input of gates 312, 313 to enable the outputs of these gates and to activate the relay holding matrix to energize a speaker relay.

A further control function performed by the telephone sensing lines (antecedent) is to control the busy lamps on the administrative telephones. This is accomplished by the gate 291 in which either a staff or administrative hold signal will produce an output low through line 315 to inverting gate 316, the positive output from the gate being coupled to a transistor 317 which in turn controls a busy lamp power transistor 318 which supplies power to all of the busy lamps BL on all of the administrative phones. The power transistor is self-holding through a feedback connection 319, with the current being limited by a transistor 320. Flashing of the busy lamp can be accomplished by a timer 321 which injects negative pulses into an inlet terminal of a gate 316 provided that a charging current is furnished from the DCU through terminal 322. A flashing busy lamp indicates that the system is holding some unanswered call-ins from the staff stations.

Attention will next be given to the means for transmitting data from the administrative phone set to the registers. It will be recalled that we have established seven output lines 241–247 from the tone decoders 232–235. A valid tone is recognized when one tone component from the high group and one tone component from the low group simultaneously appear on two of the lines. The detection of a valid tone is accomplished by the combined action of four-input gate 341 and a three-input gate 342, the output terminals of the gates feeding a "nor" gate 343 to produce an output signal on line 344. The signal on line 344 is fed via a resistor 345 to the input circuit of a de-bounce timer 346 which indicates that a two-tone signal has been present for a sufficiently long time as to be valid. Three "nor" gates are provided for determining whether the signal is an asterisk, a number sign, or a digit, the three gates being indicated at 351, 352, 353. The gate 351 "looks" at the two tones representing the asterisk and the output from the de-bounce timer circuit, producing a low on output line 354 which is inverted producing a signal on line 355 which applied to the clock input of flip-flop 356, thus recording the fact that the asterisk has been dialed.

Turning next to the number sign function, the gate 352 previously referred to has an output line 364, the output of which is inverted, appearing on line 365, and applied to the clock terminal of flip-flop 366, causing a record of the fact that the number sign has been dialed.

In order to determine whether a digit is present, a line connects the de-bounce timer 346 with one of the input terminals of gate 353, the other two input terminals of the gate being connected to the outputs of gates 351, 352. Absence of response from either of these gates indicates that the tone must be a digit, and a digit signal is then transferred through line 370. The signal on line 370 actuates a flip-flop 371, provided that a number sign has been dialed previously which fact is detected by a line from flip-flop 366. The same line 370 transmits a signal through gate 372 if neither the number sign (#) nor the asterisk (*) have been registered as sensed by the other two inputs of the gate to set flip-flop 373 representing that the tens digit has been dialed. If the tens digit has already been dialed, then the signal is transmitted to a flip-flop 374 to represent that the units digit has been dialed. The presence of dialed information, as represented by the previously mentioned flip-flop 356, 366, 373, is sensed by the gate 379, whose output is fed back to inhibit the dial tone oscillator in device 235 (FIG. 5b) previously referred to.

If an asterisk has been dialed and received as recorded in flip-flop 356, it will produce an output through line 375 so that the next asterisk received through line 376, acting upon gate 377 will produce a low at the gate output line 378. A low at 378 results in a loss of signal at the reset terminal of a flip-flop 380. Also a low on line 378, upon inversion in gate 382 causes a high on the "J" terminal of the same flip-flop 380. At the same time a high is applied to the corresponding terminal on a second flip-flop 381. Timing signals are obtained from the DCU and applied to a gate 383, so that the clocks of the two flip-flops 380, 381 will go through their low to high transition at the same time as the number desired for single button dialing is in place on the inputs to the MCU register as received from the DCU multiplexed output lines. The information is strobed into the register through the action of flip-flop 380 through capacitor 384. At the same time the output of the register is enabled through the action of flip-flop 381, as transmitted through gate 312, to cause the desired data to be fed to the relay control matrix.

When the asterisk button is released, the response from gate 377 is lost, causing a high to appear at output 378, thereby resetting flip-flop 380 but not 381. The next step asterisk pulse, when received, will result in another output strobe pulse from flip-flop 380 but without any change in flip-flop 381. This arrangement, as will be discussed, permits the answering of the first one of a series of call-ins by pressing the asterisk button twice, and permits the answering of successive call-ins in turn, by successive single pushes of the asterisk button.

Turning next to the single button dialing, or SBD, register, it consists of two IC circuits which, taken together, form a single register 390 on a single chip. This register receives data from the digital display control unit DCU on left-hand terminals 391. The data is stored in the register upon receipt of a positive pulse at the strobe terminal through capacitor 384. However, data stored in the register does not appear at the outputs until the disable signal from the gate 312, applied to the output disable terminal, goes low. While the output disable terminal is in its normal or high state, all of the output terminals, indicated at 392, appear as open circuits. The voltages on such open circuits are maintained in the high state by a resistor network 393. BCD information from the outputs of the register is transferred to the BCD-to-decimal converters 394, 395. During the idle condition when all of the inputs are high, both of the BCD-to-decimal converters will have all outputs in the low state. This fact is utilized to disable the relay control matrix under normal idle conditions. When valid BCD information is transmitted from the registers to the converters, each of the converters will have one of its ten lines in the high state, the upper representing the tens or "T" digit dialed and the lower representing the units or "U" digit.

Coupled to the output of the converters 394, 395 is a matrix 400 which consists of a total of 100 transistors in a square configuration so connected that the horizontal rows progressively indicate the tens digit T, starting from the top, and the vertical rows represent the units digit U, starting from the left.

For the purpose of grounding all of the transistors at a selected "tens" level, a set of grounding transistors 401 is interposed between the tens converter and the matrix. For the purpose of energizing a matrix in accordance with a received units digit, the output terminals of the units converter 395 are connected to the base terminals of transistors in the respective vertical rows. Thus receipt of a tens digit, plus receipt of a units digit, causes activation of a given one of the 100 transistors for operating the corresponding speaker relay in the switch panel.

Having covered the single button dialing, or SBD, means for activating the converters 394, 395, attention may next be given to activation of such converters by the dialing of two separate digits at the administrative telephone set. This is accomplished by coupling the converters 394, 395 to a register 410 whose output can be enabled to control the converters in lieu of the output from the register 390.

To understand how data is loaded into the register 410, reference is made to the seven tone lines 241–247 (in FIG. 5b). The tone information is transmitted to a "2 of 7"-to-BCD converter 411. The converter 411 has protective diodes 412 at the input. The output of the converter is in the form of BCD representation of the number being dialed from the administrative phone. The output lines from the converter are fed through a level shifter or buffer 413 producing BCD dailing information which is, in turn, transmitted via lines 414 to the registers for storage.

For the purpose of strobing the tens digit register 410, a "nor" gate 420 is provided which is connected to the output of gate 372 and flip-flop 373 previously mentioned. When a digit is dialed the line 370 causes a low at the output of gate 372 which, in combination with the low output from flip-flop 373, causes a high from gate 470 which strobes the BCD digit into the tens register, 410. When the tone button on the administrative phone is released, the output of "nand" gate 372 goes high again setting flip-flop 373 which disables the tens register strobe thru the "nor" gate 420, primes flip-flop 374 to respond to the next, or units, digit dialing signal. The units strobe is obtained from the "nor" gate 421 to load the units BCD data in the same manner as was used for loading the tens digit. To transmit the BCD code from the registers 410 to the converters 394, 395, the disable signal is changed from a high to a low state through gate 313 and flip-flop 374. The information affects the matrix in the same way as the SBD information from the registerw 390 previously mentioned.

For the purpose of dialing one of the other administrative phones a register 430 is provided having input terminals connected to the lines 414 which carry the BCD information. Since the strobe terminal of the register 430 is constantly positive, the information on the lines 414 constantly affects the register. To obtain an output from register 430 it is sufficient to receive a low signal at the disable terminal, such low signal being derived from gate 431. It is controlled by flip-flop 356, which shows that an asterisk (*) has been dialed, and the output of gate 353 whose function was previously described. The output lines from register 430, and which are indicated at 432, control a BCD-to-decimal converter 433 having output lines 434. Thus when a valid tone is received by the converter 433, a current is produced turning on a triac 435 which in turn turns on another triac 436 which transmits 6 volt AC power out through line 437 to the buzzer BU at the called administrative phone. It will be understood that a pair of triacs are provided for each of the output lines 434.

For the controlling of special functions from the administrative telephone, another register 440 is provided which is connected to the same input lines 414, whose strobe is controlled by a gate 441 under the control of flip-flops 366, 371. Flip-flop 366 is set when # is dialed as indicated at line 365 and previously described. The output from flip-flop 366 enables flip-flop 371 to respond to the next dialed digit pulse, thereby turning on and causing both the strobe and the output enable signals to be applied to the register, 440. The output lines 442 from the register 440 are fed into a converter 443 whose outputs are available to control one of a number of special functions.

The catalog designations and terminal numbering of key MCU components are as follows:

| IC | Type and Function | Component | Terminal Numbers (Clockwise) |
|---|---|---|---|
| 2567 | tone rec. | 232 | (1 2 3 6 7 8 9 12.13 14.11 10 4.5 15 16) |
| | | 233 | (same) |
| | | 234 | (same) |
| 4027 | FF | 290 | (14 15 12 9) |
| | | 356 | (2 1 3 4 6) |
| | | 366 | (2 1 3 4 5 6) |
| | | 371 | (14 13 12 10) |
| | | 373 | (2 1 3 4 6) |
| | | 374 | (14 15 13 12 10) |
| | | 380 | (2 1 3 4 6) |
| | | 381 | (14 15 12 10) |
| 556 | timer | 321 | (13 8.12 11 9) |
| | | 346 | (5 3 7 4.10.14 2.6) |
| 4048 | and/or invert | 341 | (5 6 4 3) |
| | | 342 | (13 11 12 14) |
| 4419 | 2 of 8 to BCD | 411 | (13 12 11 10 7 6 5 4 3 2 1) |
| 3401 | quad op. amp. | 413 | (10 9 5 4 2 1 13 12 11 8 6 3) |
| 4508 | latch | [390 | (11 9 7 5 2 3 1 4 6 8 10) (upper) |
| | | [390 | (23 21 19 17 14 15 13 16 18 20 22) |
| | | [410 | (11 9 7 5 2 3 1 4 6 8 10) (upper) |
| | | [410 | (23 21 19 17 15 13 16 18 20 22 14) |
| | | 430 | (23 21 19 17 15 13 16 18 20 22 14) |
| | | 440 | (11 9 7 5 3 1 4 6 8 10 2) |
| RCA 4028 | BCD to dec. | 43 | (3 14 2 15 1 6 7 4 9 5 10 13 12 11) |
| MO7 4028 | BCD to dec. | 394 | (3 14 2 15 1 6 7 4 9 5 10 13 12 11) |
| | | 395 | (3 14 2 15 1 6 7 4 9 5 10 13 12 11) |
| | | 443 | (3 14 2 15 1 6 7 4 9 5 10 13 12 11) |

Switch Panel

The matrix 400 in the MCU has a total of 100 output lines indicate at 450, 450n to provide a capacity of 100 staff stations 500. These output lines are fed to 100 relays 501 which may conveniently be located in the switch panel shown at the right hand side of FIG. 12. Each of the relays 501 has a coil 502 and a set of DPDT contacts 503. In the normal, unenergized, state of the relay coil 502, the relay connects an audio program, if used, to the speaker indicated at 510 in the staff station. The normal program may, for example, consist of background music, radio programming or other function as selected by selector switches 511 associated with the respective relay contacts.

Energization of the relay 501 corresponding to a particular matrix position causes the contacts 503 to switch from the programming to a connection with the so-called "S bus" which is a balanced line connected to the right-hand terminals (FIG. 6c) of the VCM unit. This connection permits two-way communication with the staff station in the "listen" mode until such time as the administrator speaks. As will be recalled from the discussion of the VCM, a voice signal from the administrator's telephone set puts the VCM in the talk mode so that the administrator's voice comes over the loudspeaker. As stated, there is a capability of 100 staff stations, with the nth station being indicated by corresponding reference numerals with subscript n.

Staff Phone Adder or SPA

Referring to the SPA unit, shown at the left-hand side of FIG. 12, the same lines 450 which select the relays 501–501n are utilized, in the SPA unit, to complete a circuit to the telephone which is in the particular staff station. A representative staff station telephone, indicated at 520, has terminals 521, 522 with an interposed hook switch 523. The terminal 521 is connected to the telephone line 213 referred to earlier and which appears in FIG. 5a via a triac 525 having a control terminal 526. The control terminal is coupled to the matrix controlled line 450 by a diode 527.

The opposite phone terminal 522 is connected to the second telephone line 214 (again see FIG. 12) via a diode 528 which isolates the phone from the audio signal until it goes off-hook establishing a DC path through the triac 525.

Once the telephone 520 goes off-hook and establishes a DC current path, the control signal 526 from the matrix is no longer necessary and the circuit is self-holding.

While only one telephone circuit has been discussed, it will be apparent that the circuit is repeated at each of the staff phones, up to a hundred in number, with a typical additional circuit being indicated in unit SPA by the same reference numerals with the addition of subscript n.

We have discussed above a complete staff station including both a loudspeaker 510 and a telephone unit 520. It will be understood, however, that the system is operative for "intercom" purposes without the staff telephone 520, which is provided to achieve privacy or inter-staff communications and which may be considered as an option to the basic system. Thus the associated circuitry in the SPA unit should also be considered as optional.

In accordance with the invention each staff telephone station has a call-in switch for the purpose of signalling to the administrator that the staff person at the particular station wishes to communicate. Such call-in switch is indicated in FIG. 12 at 530 connected to a call-in line 531. The call-in line 531, and the call-in lines from corresponding other ones of the staff stations, feed into the call-in encoder CIE which will be discussed in the next section.

Call-In Encoder or CIE

For the circuit of the call-in encoder reference is made to FIG. 11.

The call-in line 531 from the staff station comes in at the left-hand side of the CIE along with the corresponding call-in lines from the 99 other staff stations. Each call-in line has two resistors such that when grounded, produce currents in two comparator circuits, one representing the tens digit and the other representing the units digit of the calling staff station number. The circuits are identified by letter (T or U) and number on the diagram. The resistors connected to the call-in line 531, and which are indicated at 532, 533 are connected to terminals T0 and U1, respectively. A typical signal produced at 531 appears as a shift from 9 to zero volts which is divided down to 100 millivolts by a resistive divider circuit before being fed to capacitors 543, 553.

The capacitors transmit the 100 millivolt call-in signal to input terminals on the analogue comparators 540. All comparators have their input terminals set to D.C. bias levels derived from the 12 v.DC system supply by a resistor network 547 chosen so that all terminals are biased at about 10 v.DC, but with the "REF" (−) terminals about 50 millivolts lower than the input terminals. This causes all 20 comparators to have their outputs in the high state during quiescent conditions. When a call-in occurs, by staff station "01" for example, 100 millivolt negative signals are transmitted thru the capacitors 543, 553 causing a reversal in the differential input voltage on the two comparators 540, 550. The outputs of the latter will then go from high to low, and remain low until the capacitors accumulate enough charge to offset the differential. The negative output pulses thus produced represent the tens and units digits of the calling-in staff station. Each output terminal has an associated resistor 556 controlling a transistor 557. This control is accomplished by connecting all of the resistors in a current summing circuit feeding the base terminal of transistor 557 so that the transistor is turned on when at least two of the comparator circuits are energized. The turning on of the transistor produces a "call" signal at terminal 558.

Means are provided for converting the comparator output signals to a BCD signal by means of a gate network 560 consisting of "nand" gates 561-568, the gates having a catalog designation of Type 4012. The output terminals of the gates are formed into an eight conductor cable 570 which transmits data in BCD form. The output of the CIE unit, via cable 570 and terminal 558, feeds into the display control unit DCU to be described in the following section.

Display Control Unit or DCU

The circuit of the DCU is shown in FIGS. 7a-7d, but to facilitate understanding of that circuit the main elements thereof have been incorporated in a block diagram which is FIG. 7d.

The DCU receives input information via cabled lines 570 and line 558 from the CIE. It will be recalled that a signal on line 558 indicates that a staff station is calling in, and the signals coded on the eight conductor cable 570 indicates the number of the particular station doing the calling.

In the discussion which follows reference will be made to FIGS. 7a-7d, as appropriate. Referring first to FIG. 7d, the number of the calling station, coming in on the cable 570, is temporarily stored in latch L. Simultaneously the call-in signal on line 558 activates a flip-flop LA to mark the start of the load cycle. For the purpose of storing and displaying call-ins a shift register is provided consisting of the units SR and PSR. In the shift register there are 100 bits of storage, 80 bits being included in the serial portion SR and 20 bits being included in the parallel-serial portion PSR.

With the flip-flop LA on, by reason of the signal on line 558, the shift register steps continuously until it reaches the start position. At that time the flip-flop LA is turned off and the flip-flop LB is turned on marking the start of the compare cycle. In the CER compare cycle the number of the station stored in the latch is compared to the numbers being held in the register SR, PSR in order to insure that there is no duplication. If duplication is found, the load cycle is terminated. In the preferred form of the system, duplication is utilized to establish priority for the incoming call. Such priority signal, and the manner in which it is utilized, will be discussed in subsequent paragraphs.

If no duplication is discovered after the shift register undergoes one complete cycle, then the flip-flop LB is turned off and the flip-flop LC is turned on. With LC turned on, the information in the latch L is stored in the first empty "cell" in the shift register. The latch contains eight bits defining the number of the call-in station. Two additional bits are included into the shift register storage cell for control purposes. The first of these, called the control bit, is indicated at CN and is used to indicate the fact that the information in this cell is still current and that the call-in is therefore required to show in the display. The other control bit, CP, is utilized to assign a priority status to certain calls.

Information is transmitted to the portion PSR of the shift register in parallel format. A data selector S is provided which selects either of two sets of 10 bit data for loading into the shift register. The loading of a new call is accomplished with the data selector in what is referred to as the "Y" mode. In this mode the eight bits supplied by the latch and the two controlling bits are transmitted to the output of the data selector and into the upper 10 bit portion of the PSR. In this mode the lower ten bit portion of the PSR is simply recirculated and remains unchanged. The effect of this is to transmit the incoming call into the shift register storage so that it can be displayed to the administrator. When this loading operation is completed, the LC flip-flop turns off, marking the end of the load cycle.

Once the information is loaded into the shift register it is transmitted at intervals to the seven segment decoder SSD which converts the stored information in the shift register to a form suitable for operating a digital display, in accordance with conventional multiplexing techniques. The output signals from the SSD are further boosted by the buffer before transmission to the read-out segments along 14 conductors, as is conventional. The read-out also receives a complimentary "word select" signal, as will be described.

When not performing the load cycle, the shift register continues to run thereby displaying successively each of the call-ins in storage to the comparator CER. The CER compares the stored call-in number with the data in the system dial register in the main control unit MCU. Response from this comparator indicates that an administrator in the system has dialed and responded to one of the call-ins whose number is stored in the shift register. This indicates that the call-in has been answered by an administrator and should be removed from storage. This is accomplished by having a data selector assume the "Y" mode in a manner similar to that described for the load cycle except that the control bit CN, and priority bit CP, are set to zero.

When a cancellation occurs, a blank space will be observed at the particular cell or readout position corresponding to the call just cancelled. In this case it is desired to move the other calls which are in storage up one step to fill the empty position.

To accomplish an exchange between an empty cell and the cell below it, the X mode of the data selector is utilized. In this mode the output of the upper cell is fed to the input of the lower cell and vice versa. To sense the requirement for effecting an exchange, the system senses the status of the output control and priority bits of the SR, PSR. This process is automatically repeated in the successive positions so that the empty cell is moved to the end of the line.

In carrying out the present invention means are provided for a staff station to assign priority to its call-in resulting in the call being moved from its normal position in the stack to a priority position. If a call is a priority call it will have a priority bit 1 as indicated at the output of the PSR. The priority bits associated with the respective call-ins instruct the system as to when to perform exchanges for the purpose of moving stored call-in to the highest available position in the display.

The timing of all of the operations, discussed above, in the display control unit is controlled by a clock C whose output feeds an index counter IC. The index counter provides a signal, I, which indicates that the shift register is indexed upon one of the register memory cells so that a display can take place. A display timer T feeds back to stop the system clock and hold the display long enough for the "I" to respond to it. At the end of the display time the clock feeds out another ten pulses to advance the shift register to the next indexed position. The "I" signal is fed to a word select counter WS which has ten outputs indicative of the word presently being displayed. The first three of the word select signals are fed to a word buffer WB which provides the multiplexed ground signals to the readout display to work in conjunction with the segment drive signals from the buffer B previously referred to.

Having understood the block diagram FIG. 7d, attention may next be given to the more specific circuit diagram set forth in FIGS. 7a–7c. The circuit diagram will be explained by taking up a typical situation in which there are three call-ins displayed at the administrator's telephone.

The shift register consists of five IC devices 601–605 in PSR plus a sixth device 606 in SR. Such registers step continously in accordance with pulses received on the "C" or clock terminals. The clock input lines are indicated at 611, 612, line 611 driving the serial shift register SR and the line 612 driving the parallel shift register PSR. Both clock signals are derived from the clock circuit which consists of two gates 613, 614 and flip-flop 615. The two clock signals operate in unison except that when the PSR shift register is being loaded with parallel data, an extra clock pulse is provided on line 612 for executing that load operation. All operations in the shift registers are timed to occur on the positive transition of the clock pulse, and the extra pulse, when used, is derived from a negative going transition of the basic clock pulse on line 611. This inversion is accomplished by the "exclusive or" gate 620 under control of the parallel-serial command on line 621. The line 621 will be high whenever the system is in the "X" or "Y" mode, as previously described and as sensed by gate 622. The clock output on line 611 is also fed to a decimal index counter 623 which provides a positive output pulse for every 10 input pulses to indicate when the shift register is centered on a word. For present purposes, a word will consist of ten bits including the data identifying the call-in plus the two bits used for control purposes. The output of the index counter 623 is set to a display timer 624 to determine how long the shift register should dwell on the present word. The same index signal is fed through gates 625, 626 and 627 back to gate 613 of the clock to stop the clock until the completion of the display period. The output of the gate 625 is also inverted by inverter 630 to produce the signal referred to as "I" which is used in timing many of the functions of the DCU. The output of the index counter 623 also goes to the word select counter 631 in WS. The latter counter has ten outputs fed thru a buss line 632 which indicate the word presently in the display position. The signal on line 632 is fed to two-transistor buffer circuits in the word buffer WB, three circuits conveniently being provided for a three call-in display. The buffer outputs, indicated at 633, 634, 635 go to the common cathodes of the respective call-in displays at the administrative telephone. Provision 636 is made for additional buffer circuits to be added for showing more than three call-ins in the display, if required.

It has been stated above that there are three stacked calls in the display. Consideration will now be given to showing how these calls are maintained in the display. The PSR has 20 output lines, the top ten of which are utilized for operating the display. The eight lines 640 carry the BCD data in time division multiplexed form representing the number of the call-in being displayed at any given instant. Associated with these are the line 712 which carries the control bit and is transmitted through gates 642 and 643 (FIG. 7a) to the seven segment decoder devices 644, 645 in SSD. The control bit serves as an enable signal causing the segment decoders to produce seven segment drive signals for the call-in being displayed at a given instant. In the example given, three successive call-ins would be indicated by high control bits with the corresponding BCD call-in data during three successive intervals of time. Then seven subsequent intervals of time occur, representing empty spaces in the memory capacity of the system, during which the control bits remain low. The output level of the SSD being of insufficient power for driving the segments, a buffer 646 is provided, one for each of the fourteen segments, the $n$th buffer being indicated at 646$n$. Current is transmitted to the segments via limiting resistors 647, 647$n$.

In order to understand how connection is made to the individual segments, reference is made to FIG. 7c where the three numbered spaces are indicated at 651, 652, 653. The numbered spaces are under the control of cathodes 654, 655, 656. The latter are connected via correspondingly numbered lines to terminals 633, 634, 635 and word select buffer WB. While no actual station numbers have been employed in the explanation, it may be assumed, for example, that the three numbers which occupy the display are 11, 12, and 13 as shown in the figure.

With the three numbers in the display it will next be assumed that the call-in switch at another staff station is actuated, for example station 21. The data indicative of the number 21 will be received from the CIE board at terminals 670 of the IC devices 671, 672 in the latch L. Concurrently, a call signal pulse from the CIE applied to terminal 673 feeding through a timer circuit 674 causes an output response passing through inverter 675 turning on flip-flop 676 in LA. The output signal from the flip-flop then feeds through gate 677 to line 678 causing a high signal to appear at the clock inputs of the IC in the latch L. The signal is delayed by the timer in order to allow the input data time to stabilize before being loaded into the latch.

The inverter 675 just mentioned also feeds a pulse to a "beep" timer 679 whose output is amplified by the transistor 680 causing a single pulse on terminal 681 which drives a suitable audible signalling device 682.

As mentioned previously, the turning on of flip-flop LA marks the start of the load cycle, which also involves the subsequent turn of flip-flops LB and LC. Since each flip-flop has a connection to the gate 677, its output on the line 678 will be high during the entire load cycle. This high is fed to the system clock through gate 626, to increase clock speed to maximum by preventing any display periods (typically 1.5 millisecond long) from occuring during the long period. This reduces loading time from 45 to 3 milliseconds maximum.

Now the number 21 holding in the output of the latch L will continue to hold until the loading cycle is completed. The output of flip-flop 676 in LA (FIG. 7a) places a high on the input to the next flip-flop device 685 in LB, causing it to be sensitive to the clock input 686 which is connected to the word select counter 631 and which goes high with the start of the first word in storage. When that word occurs the flip-flop 685 turns on, causing a reset signal which turns off flip-flop 676. This marks the beginning of a compare cycle which is performed before loading the new number 21, thereby to make sure that such number is not already in the storage register. To perform this checking for duplication, comparators 691, 692 (FIG. 7c) are employed in the CED (Call-in Equals Display), such comparators being connected via a set of lines 693 to the output of the latch. The comparison inputs of the comparator are in turn transmitted through the lines 694 to the BCD outputs in the upper portion of the shift register PSR.

The comparator is enabled by the status of the control bit as received from the PSR through line 695. The output, indicating that a match has occured, is fed through a line 696 to a gate 700 which has two other input requirements: First the index signal from inverter gate 630 must be high showing that the shaft register is centered on a word, and second the output of flip-flop LB must be high showing the comparison phase of the load cycle is in effect. When these conditions are met, the output on line 701 will go low. When duplication is not present, so that the gate remains inactive, the search for duplication continues until the shaft register cycle is completed as indicated on the line 686, causing flip-flop 702 in LC to turn on and the flip-flop 685 in LB to turn off. The flip-flop 702 marks the start of the search for an empty shift register memory cell for the number 21 to be loaded into. During this period the output of flip-flop 702 is fed through line 703 to gate 704. To satisfy the other input of gate 704, one of two conditions must be present as sensed by the gate 705: One, the shift register must be indexed on a cell with control bit zero. This is sensed throgh line 708, inverter 709, a buffer flip-flop 710, and gate 711, the latter having a lead 712 connected to the control bit output 641 of the shift register and another enabling input lead sensing the start of an index period. The second condition is that if no vacant memory cells are detected before reaching the tenth and last shift register memory cell, as sensed through an inverter 713 and word select counter 631, then the incoming call 21 would replace the call in the tenth position.

In the present example, the first three positions are filled, and upon coming to the forth position, the control bit is zero causing the gate 704 to respond by having a low output. This is a sufficient condition to obtain a high output from gate 715, having an output line 716, and which causes the system to go into the "Y" mode previously described. The output on the line 716 is also transmitted to the input of gate 622 which reverses the phase of the PSR clock line 612 so that the parallel loading operation will be accomplished during the negative transition of the regular clock.

The data selector S includes IC devices 721-725. During the loading operation, the data representing the call-in station number 21 will be transmitted from the latch L on eight lines indicated at 726. This information is transmitted through the data selectors to the input terminals of the shift register due to the fact that the data selectors are being held in the "Y" mode by the signal on the line 716. At the same time the control bit input, arriving on line 727 will be set high by gate 730. Which has a high output because of the low on line 802 from the cer FIG. 7a to be described later. For a normal call, such as being described, which does not have priority, the priority bit will be zero and the required low signal will be as obtained through gates 732, 733, to be more fully described.

Having established the required ten bits for the call-in presently being loaded, it is also necessary to provide appropriate input to the lower 10 bits of the PSR, since all twenty bits are controlled by the same clock line. For this purpose, snce it is desirable to maintain the same data in this memory cell, the outputs of the shift register are simply fed through the lines 734, 735, 736 to the "Y" inputs of the data selectors and therefrom to the corresponding inputs of the shift register.

With the proper conditions established on the 20 input lines of the shift register, as just described, and with the shift registers put into parallel mode, the clock pulse will occur causing the data to appear in the outputs. The station 21 will now have its number represented in BCD form in the upper portion of the PSR register, and the appropriate seven-segment drive signals are applied to the segments of the readout. However, since the number 21 is loaded into the fourth memory cell of the shift register, the word select device 631 will be activated which does not have any circuit in the word buffer. Since there is no fourth position in the readout device, as normally supplied the number 21 will not be visually displayed. It will be held until there is a vacated space in the display and will thereupon show up automatically in the third position.

The above loading of the number 21 into the fourth position in the register assumes that the number has not been given priority. However, as mentioned, it is possible for the person at the staff station to assign priority to the call which he originates by the simple expedient of pressing the call-in switch a second time. Upon pressing the call-in switch a second time, the CIE will transmit a call signal and the necessary identity data to the DCU just as described. The flip-flop 676 in the LA unit wll turn on until the number 11 reaches the top of the stack, at which time the LB flip-flop 685 will turn on and the initial flip-flop 676 will return to the off condition. The flip-flop 685 marks the start of a compare cycle during which the CED comparators 691, 692 compare the output of the shift register with the number 21 now loaded in the latch. We know that in this example a match, of duplication, will occur when we get to the forth word. At this time an output will be received from the comparator via line 696 which will affect gate 700 (mentioned previously), causing a low on line 701 which is inverted by gate 740 producing a high which will pass through the priority option jumper 741 which is shown in the normal position. The high is transmitted to the gate 733, which also has a high on its other input, supplied by gate 730 to be described later, resulting in a low in the output. The low output of gate 733 is inverted by the gate 732 to produce a high which is applied to the priority bit input of the "Y" channel of the data selector IC 725.

The line 701, as just mentioned, also affects the gate 715, producing a high on the output terminal 716 which in turn puts the data selectors in the "Y" mode and the shift register in the parallel mode and, in addition, reverses the phase of the PSR clock to accomplish loading in the same manner as previously explained, except that in this case the priority bit is set at a high level as the number 21 is being reloaded into a cell where it is already present.

Whenever the clock line 612 is inverted in order to accomplish a loading into the shift register, it will be noted that it has the opposite polarity as that on line 611 (the basic clock). Thus when the signal on line 612 is inverted by the gate 742, two in-phase signals are received by exclusive "nor" gates 743, causing a high output on output terminal 744 which immediately terminates the load cycle by turning off flip-flop 702 in the case of a normal load cycle or flip-flop 685 in the case of a priority boost as just described.

To summarize, the second receipt of the number 21, causes it to be re-recorded, with a priority bit, in the same memory cell in which it was originally recorded. This results in exchanges taking place between adjacent numbers in the stack as necessary to advance the number 21 to a priority position, accompanied by flashing of the number and the sounding of a repeated beep. To accomplish these functions the priority bit once loaded through line 731 and the data selector DS, appears on line 745, the first output bit in the memory cell occupied by the number 21. This bit is high for the call-in 21 whereas the corresponding bits for the other three call-ins will be low. As the shift register PSR and SR cycles, the bits travel upward into the SR register the output of which is recycled via line 746 to the bottom of the shift register PSR. A position is eventually reached where the prior call number 21 will occupy the lower half of the PSR register, and its high priority bit will be present on the line 747. The upper cell of the PSR register will then contain the third call-in in the stack having a low priority bit on line 745.

A comparison will be made in the logic to show that the second word has a high priority bit and the word before it has a low priority bit. This is a basic requirement needed to trigger an exchange cycle. The exchange cycle is initiated by a high signal on line 750. In this case the high on the line is received through an "or" gate 751 and the "and" gate 752. To receive a high output from the "and" gate 752, it will be necessary to show that all four inputs are high. One of the inputs, line 753, comes from terminal 754 on IC device 725 of the data selector. From there, the signal travels through the cable to terminal 755 on IC device 723 of the data selector, and from there through a cable 756 to terminal 757 on the shift register device 603. This corresponds to the priority bit of the word 21 which we have said to be high. Having established one of the requirements for the "and" gate 752, we will establish an additional requirement by following the signal from the priority bit in the upper word of the PSR. This priority bit originates at IC device 605 and travels through conductor 745 to reach one of the terminals of gate 761. Since this priority bit is low, the output of the gate, on line 762, will be high. The high is inverted by gate 763 and applied to the reset of one of the buffer flip-flops 710. Such flip-flop is set by a signal received from the index counter 623 just prior to the index going high. The low applied to the reset terminal of the flip-flop, does not change its state; therefore the output of the flip-flop remains high. As a result the input appears as a high on the line 764 which feeds "and" gate 752. The "and" gate 752 also has an input 765 which originates from the inverter gate 713 and indicates that the tenth or last word is not being displayed, in which case an exchange would not be desired, because it would be an exchange between the top of the stack and the bottom of the stack. The final requirement to satisfy "and" gate 752 is the signal obtained from gate 626 whose inputs are responsive to the fact that the system is not in the process of executing a load cycle, and the system is indexed with the I signal high. Having satisfied the "and" gate 752 and therefore the "or" gate 751, a positive signal is obtained on the line 750 which is fed to the data selectors to select the X inputs and also fed through the exclusive "or" gate 622 to alter the phase of the clock driving the PSR so that an extra clock pulse may be obtained causing the parallel load operation.

During the parallel load operation, the upper 10 bits from the output of the shift register are fed through the data selector X inputs to the lower 10 bit inputs of the shift register PSR and vice versa.

As soon as the exchange is executed, the call-in number 21 will be transferred to the upper memory cell of the PSR and the lower priority call will have been transferred down to the lower memory cell. The exchange will result in a loss of the high priority bit signal from line 754 feeding "and" gate 752. This causes the termination of the exchange cycle and restoration of the clock to normal.

On the next cycle of the shift register, when the word 21 appears in the lower portion of the shift register PSR, and a lower priority call is present above it, another exchange will take place, and so on, until the priority call 21 reaches the top of the stack. In the event of more than one priority call, exchanges will not take place between two priority calls.

When a priority call is present in the shift register, a high will be applied to the gate 761 which, when the index signal I is high, will result in a low output which is applied to the inverter 763 to produce a high at its output. That output will set the last section of the flip-flop buffer 710, the reset being applied to the flip-flop at the end of the display cycle of the tenth caller. The output on line 766 will therefore remain high for most of the shift register cycle if a priority pulse is received with the first word. This positive voltage will feed the timer 679 resulting in a continuous train of output pulses affecting transistor 680 to produce amplified pulses on terminal 681 which feed the audible signalling device 682. In this way a continuous beeping alarm is produced to advise the administrator that there is a priority call awaiting his attention.

Means are also provided for flashing the priority call-in-display. For this purpose a flash timer 770 is provided which operates continuously and which feeds through an inverter 771 to control a "nand" gate 772. The central input terminal of the "nand" gate is connected to the line 745 so that the readout is blanked out during the periods when (a) the priority bit of the displayed word which is indicated on line 745 and (b) the timer signal on line 773 are both high. The resulting low output disables gate 642, so that the readout loses the enabling signal normally provided through gate 642 and inverter 643 to the enable input of the SSD decoders 644, 645.

As a result of the above, the number 21 is caused to appear at the top of the stack flashing and accompanied by a repetitive beeping signal as shown in FIG. 8.

For the purpose of answering the staff telephone 21 under such conditions, the administrator goes off hook and dials the number 21, either by pressing the single dialing button (*) or by pressing the numerals 21 on the dialing pad. In both dialing procedures the number appears in BCD code at the lines connected to the outputs of the registers 390, 410 (FIG. 5c). The BCD data is transmitted from the registers to the input terminals 801 of the comparators 80 (FIG. 7c). When the comparator 800 is enabled by a signal on line 695, indicating a high control bit, it makes a comparison between the number on the readout as read from the lines 694, and the no. in the dialing register fed through lines 801. When a match occurs indicating that the number dialed by the administrative telephone is the same as that appearing on the display, the call is completed and communication is established between the administrator and the staff station. At the same time a sequence is initiated by the comparators to cancel the staff station number in storage to remove it from the display.

When the comparator output signal on line 802 is high, it activates the gate 730 (FIG. 7a) provided that certain other input conditions are met. These conditions are as follow: The system must not be in process of executing a loading operation and the shift register must be indexed to a valid memory location (line 812). Moreover, the control bit must be high as indicated by the output of the flip-flop 710. The low output of the gate 730 is transmitted to the control bit input position on the "Y" channel of the data selector 754 so that when a "Y" load operation is executed, a low, or inactive, control bit will be entered into the shift register PSR.

The same low signal causes a high on the output of the gate 715, which puts the system in "Y" mode. Its high output is transmitted through line 716 to cause the data selectors DS to transmit the "Y" input data to the input lines of the shift register. The signal on line 716 also causes a response from gate 622, whose output feeds a high signal along line 621 to force the register PSR into parallel loading mode.

The same signal is applied to gate 620, reversing the phase of the clock line 612 as described in the other shift register loading operation. This produces the extra clock pulse needed to complete the parallel loading operation.

In the example given, the first memory cell would be in place and causing the display to show the number 21 at the time that the comparator match occurs and the above sequence takes place. In this sequence the data loaded into the shift register PSR is unimportant except for the control bit which is set to zero. The data for the number 21 which had been in the shift register is now replaced with whatever data had been in the latches 671, 672 at the time when the cancellation of the control bit occured.

With the control bit low, the line 641 will cause a loss of the readout enable signal through the gate 642 (FIG. 7a) as previously described whenever the first memory cell of the shift register comes into readout position. During this time the first position of the readout will be blanked out and calls will only be displayed in second and third positions. The discussion which follows will show how the blank position is eliminated from the display area by a series of exchanges.

During the time when the blank space left from the call-in 21 is indexed to the display position, a zero control bit will be received through line 712 and gate 711 causing the setting of flip-flop 710 and a high on output line 708 which is fed to gate 810, which is associated with gate 752, (which was mentioned in describing exchanges related to priority call-ins). This high signal satisfies one of four requirements needed to secure an output. The second requirement is satisfied by the signal received on line 811 which carries the control bit of the second word in the PSR which must be high. The third requirement is met by line 765 which carries the signal to prevent an exchange from occurring between the first and last words as a result of a comparison between the control bits of the first and last words when the shift register is just about to start a new cycle. The fourth requirement is satisfied by a signal on line 812 and which is used to prevent any exchange from occurring when the shift register is not properly indexed or when the system is engaged in a loading cycle. Therefore the basic function performed by the gate 810 is a comparison between the control bits of the word in the display position and the control bit of the next word. In the present example the first word having been cancelled, the control bit will be zero simultaneously with the control bit of the next word being one, or high. This means that an exchange should take place and a high is received from the output of gate 810. The high is transmitted through the "or" gate 751 causing a high on the line 750. This initiates an exchange cycle precisely as described previously in the case of exchanges relating to the handling of priority call-ins.

When this exchange is completed, the blank space moves down to the second position. However, when the shift register advances to display the next call the blank will again occur in the display position, and if another call-in is held at that time in the next position, as evidenced by the control bit, another exchange will take place just like the one mentioned above. Such exchanges will continue to take place, down the line, until no more blank spaces are detected in positions above valid call-ins.

The original numbers 11, 12, 13, which were displaced downwardly by the priority call-in 21, will, when station 21 is answered by the administrator, be restored to their original 1-2-3 positions in the display stack. The administrator can now answer the first call in the stack or either one of the other two calls as he may wish.

The circuit as described above provides for the assignment of priority to a call by a staff station by the simple expedient of operating the switch 530 (FIG. 12) twice. Where the switch 530, as is usual, forms a part of the telephone, priority is assigned to a call by "jiggling" the hook.

However, it is one of the features of the present invention that priority may be restricted to certain ones of the staff stations by providing an auxiliary priority switch and by changing a "jumper" in the circuit of the DCU which has just been described. The separate priority switch indicated at 820 has an output line 821 which is returned to a separate priority "common" (SPC) terminal in the DCU (FIG. 7b). When the separate priority switch 820 is closed momentarily, this performs two functions: it provides a call-in signal and it automatically assigns priority status to the call.

When the switch 820 is closed, it draws current from the CIE producing a low in the CIE input terminals which identifies the staff station at the display. The current drawn through the switch 820 is fed via line 821 to the separate priority common terminal SPC (FIG. 7b) which takes the place of the normal common ground. The current received in the terminal SPC momentarily turns off a transistor 822 causing a positive voltage to be fed via line 823 to a jumper terminal 824. The terminal 824 is connectable by a jumper 825 to the input of gate 733, thereby taking the place of the jumper 741 normally used. The output of the gate 733 is inverted by inverter 732 so that a positive voltage is applied to the priority bit input terminal 731 of the data selector DS. This insures that when the number is loaded into the shift register PSR in the usual way it will be accompanied by a high priority bit, thereby automatically assigning priority to the call.

It is possible to use the separate priority call-in switch 820 which makes each call a priority call as described, but it is also possible to have, at a staff station, both of the switches 530, 820. When the switch 530 is pressed, a call-in registers at the display and re-actuation of the switch is not effective to assign priority. If the system is wired for separate priority, then priority call-ins are not achievable by using the switch 530.

The catalog designations of key DCU components are as follows:

| IC | Type and Function | Component | Terminal Numbers (Clockwise) |
|---|---|---|---|
| 4035 | P/S shift reg. | 601–5 | (13 14 15 1 5 4 3 7 6 9 10 11 12) |
| 4517 | shift reg. | 606 | (15 9 5 7 3.13 4 12) |
| 4070 | excl. or | 616 | (11 12 13) |
|  |  | 620 | (3 18.9 1 2) |
|  |  | 622 | (4 5 6) |
| 4017 | decode ctr. | 623 | (3 13.15 14 11) |
|  |  | 631 | (11 9 2 3 13.15 14 12) |
| 4558 | 7-seg. decoder | 644–5 | (13 12 11 10 9 15 14 7 1 2 6 5 3) |
| 4042 | quad latch | 671–2 | (2 10 11 1 6 14 13 9 4 5) |
| 556 | dual timer | 624 | (13 8.12 11 9) |
|  |  | 674 | (5 3 2.6 4.10) |
|  |  | 679 | (9 13) |
|  |  | 770 | (5 3 2.6 4.10) |
| 4027 | dual FF | 702 | (15 14 13 11 10 12) |
|  |  | 615 | (15 9.12 13 10.11) |
|  |  | 676 | (1 2 3 5 6 4) |
|  |  | 685 | (1 2 3 5 6 4) |
| 4585 | comparator | 691 | (6 15 2 7 10 3 12 4 11 9 1 14) |
|  |  | 692 | (15 2 7 10 3 4 11 9 1 14 5 6) |
|  |  | [800 | (4 14 1 9 11 3 12 10 7 2 15 6) |
|  |  | [800 | (14 1 9 11 3 4 10 7 2 15 5 6) |
| 4043 | quad. latch | 710 | (2 9 10 1 15 14 11 12 7 6 3 4) |
| 4519 | data sel. | 721–5 | (10 11 12 13 1 3 5 7 15 2 4 6 9 14) |
| 4048 | and/or gate | 751–752–810 | (1 14 13 11 12 6 4 3 5 2.7.9.10) |

Typical Cycle of Operation—Manual Dialing

With the above circuit description in mind a typical operating cycle may be reviewed. An administrative telephone set AT shown in FIG. 2 is connected across terminals 201, 202 at the left-hand side of the MCU (FIG. 5a), such telephone having a dial pad D. A digital display or readout device DRO is associated with the administrative telephone set AT providing a column of display positions (see also FIG. 8). A plurality of dialless staff telephone stations are provided, of which two are indicated at 500, 500n at the lower portion of FIG. 11, with loudspeakers 510, 510n, the system having a capacity of 100 stations, each being assigned an identifying number. Terminals 213, 214 (also in FIG. 5a) are connected to the staff telephones via the staff phone adder SPA. A call-in switch 530 is provided at each staff telephone station, such switch being momentarily closed to signal a desire of the staff person to communicate with the administrator.

Between the administrative and staff telephones is a "central exchange" which includes the voice controlled amplifier module VCM, the main control unit MCU, the staff phone adder SPA, the call in encoder CIE and the display control unit DCU.

Means are provided in this central exchange responsive to the operation of a call-in switch 530 at one of the staff stations 500 for causing the identifying number of the staff station, for example, the station 11, to be displayed on the digital display, or readout, device SRO. Such display comes about as follows:

A ground signal from switch 530 is transmitted through line 531 to the CIE where the signal is applied to an appropriate pair of analog comparators 550. The outputs of the comparators are then encoded to binary coded decimal (BCD) form by the gates 560. The BCD information, together with a signal from terminal 558 indicating that a call-in has occurred, are transmitted to the DCU via lines 570, 558, respectively, which are connected to terminals 670, 673 in the DCU. The call signal causes an output pulse which operates an audible signalling device at the administrative telephone and also initiates a three-step loading process which causes the data from the terminals 670 to be kept in temporary storage in a latch L while the main memory of the system, consisting of the shift register SR and PSR is cycled, first to make sure that the call-in, about to be loaded, is not already in storage, and second to find an available memory location. Once loaded into the shift register, the call-in data will be sensed once every cycle of the shift register to operate the display device DRO through the SSD, or seven segment decoder, device and its associated buffer B, the outputs 647–647n from the buffer being transmitted to the segments of the readout DRO (FIG. 8).

The readout is multiplexed with each level or position having a common cathode which is driven by the word select buffer WB in response to a signal from the word select counter WS. As a result, pressing the call-in switch 530 at station 11 causes the number 11 to appear in the first position 651 of readout DRO. At the same time an output voltage received from one of the flip-flops 710 on terminal 322 of the DCU board signals the busy lamp driver circuitry on the MCU that a call-in is present, causing the busy lamp driver circuit to produce a flashing display at the busy lamp BL at all of the administrative telephone sets. Successive operation of the switches at the other ones of the staff telephone stations cause the identifying numbers of such staff telephone stations to be displayed in successive positions on the digital display device DRO. Such successive display is due to a repeat of the loading cycle just described except that, since the first memory location in the shift register SR, PSR is already filled by the earlier call-in, then the next call-in, for example, from stations 12, will be loaded in second position showing up as 12 in the second position 652 of the readout. A third call in, such as 13, subsequently made will, in a similar fashion, show up in the third position.

While three possible call-ins 11, 12, 13 have been mentioned, it will be understood that the shift register SR, PSR has storage for a total of ten called-in station numbers.

Means are provided in the central exchange responsive to the dialing at the administrative telephone of a displayed number for causing the administrative telephone set to be connected to the staff telephone station of corresponding number. Such connection (initiated at the dial by pressing the "one" button twice) is accomplished by the MCU module which has tone receiver circuits TR which serve to interpret the dialed information by providing a binary coded decimal, or BCD, output which is then stored in the dial register DR. The decimal outputs from the dial register are used to control a relay holding matrix MAT. The output of the matrix, upon receipt of data indicative of the number 11, acts to pull in the relay associated with station 11, the relay has contacts which connect the speaker to a so-called "S" bus 512 which is connected to terminals 31, 32 of the VCM (FIG. 6c). The remaining terminals of the VCM, indicated at 33, 34 are connected to the audio circuit of the administrative telephone. As a result, the loudspeaker of 510, at the selected staff station, acts, in the "listen" mode, as a microphone, with amplification taking place from right to left in the VCM, so that the administrator may listen to sound originating at the staff station. When the administrator speaks to produce an adequate administrator voice level at the terminals 33, 34 the VCM amplifier will respond by reversing its direction of amplification. Thus the voice of the administrator, now amplified from left to right in the VCM, appears at the output teminals 31, 32, thereby establishing the "talk" mode, with the voice being heard at speaker 510 at the staff station 11.

To notify the staff station that its call-in is being returned, provision is also included in the VCM for creating a supervisory tone or "beep" when contact is first made to the staff station, and then at intervals thereafter during the "listen" mode. This signal originates at the free-running oscillator circuit in the VCM whose output is switched by the solid state analogue switch 100. With communication established, the parties may then talk freely back and forth just as in an intercom system, but without necessity for using a talk-listen switch.

It is one of the features of the system that there may be provided, at selected staff stations, an auxiliary staff telephone set, the use of which silences the loud speaker so that communication may be carried on privately. This is accomplised by the SPA, as previously described.

Once the connection has been made to a staff station, means are provided in the central exchange for causing the dialed number to be extinguished and for causing each of the numbers in successive positions on the display device to move forwardly one step in the column of display positions. This is accomplished by the fact that the BCD output from the system's dial register DR in the MCU are carried by line 801 (FIG. 7c) to a comparator circuit CER in the DCU (FIG. 7c) which is constantly searching for a match between a dialed number and the number existing in the digital readout DRO. When such a match occurs it indicates that a call in has been answered and its representation is no longer needed in the DRO. Thereafter, the comparator produces a pulse which initiates a load cycle into the shift register SR, PSR in a manner which results in the extinguishment of the dialed number in the DRO.

Additional sensing circuits are included in the DCU which monitor the status of the calls which are successively stacked in the display. When the blank position remaining after a number has been extinguished is detected in a position above a valid call-in number, an exchange cycle is triggered resulting in the number's moving forwardly one step. This occurs in all of the display positions resulting in advancement of the stacked column.

When the connection is at an end, the administrator normally hangs up. This causes one of the four analogue comparator circuits used for sensing current flow out to phones in the system. To respond by producing a low on line 356. This low is used resetting all flip-flops and dial registers in preparation for the next call.

If the administrator and not the staff phone should hang up, the same resetting process take place, but does not result in the canceling of the staff phone connection. This allows the administrator to establish a conference call by picking up again, getting a second dial tone and dialing the number of another administrative or staff station. The administrator may then hang up leaving the original staff phone in communication with another administrator, staff phone, or staff speaker. The connection will then persist until the phones involved hang up.

Typical Cycle — "Single-Button" Dialing

In accordance with one of the features of the present invention means are provided in the central exchange responsive to the dialing of an arbitrary symbol on the dialing pad for causing administrative telephone set to be connected to the staff telephone station at the head of the display column DRO. In the specific circuit which has been described the double push of the asterisk button produces automatic connection of the administrative telephone to the telephone station identified by the number which is at the head of the column on the display device.

This feature, known as "single-button" dialing or SBD is of advantage in providing maximum convenience in the answering of calls in quick succession. Thus the administrator, upon seeing a flashing busy light, indicating that a call-in is waiting to be answered, can be connected to that call by the pressing (twice) of the single asterisk button, and he can be connected to any succeeding calls by pressing the asterisk button only once without having to hang up the telephone. Thus a series of stacked calls can be taken care of one after another with maximum speed and in the order that they have come in. The SBD feature also extends this convenience to administrative telephones not having the display feature so that an individual at any one of the other administrative telephones may answer calls in succession, by pressing a single button, even though he does not have pre-knowledge of the number of the call-in stations and cannot, therefore, dial them in the usual way.

While the means for achieving single button dialing have been discussed previously in connection with the MCU, the SBD procedure may be briefly summarized as follows:

It will be assumed that a call has come in to the administrator telephone and appears in the first position, of the display device DRO as previously described accompanied by flashing of the busy lamps at all of the administrative telephones. When one of the administrative phones responds by going off-hook, and by pressing of the asterisk button, the first asterisk signal puts the system in asterisk mode by turning on flip-flop 356 (FIG. 5b). The next push of the asterisk button transmits a signal to a timing circuit, as described, such that a strobe signal is provided properly timed to input data from the DCU so that the SBD registers 390 (FIG. 5c) are loaded with the number showing in the top display position. The data is obtained through input terminals 391 which are connected to the output of the shift register SR, PSR in the DCU after the strobing pulse, that required staff station number will appear in BCD form on the terminals 392. From there the output signals, accomplish two separate functions: First they are routed to the comparator CER for the purpose of extinguishing the display of that number, and secondly they are converted to decimal code by decoders 394, 395 and used for the controlling the relay holding matrix 400. The energization of one of the matrix lines causes the relay at one of the staff telephone stations 500 to be pulled in, thereby energizing the speaker at that position, so that a conversation may take place. When a connection is made completing the first of a series of stacked calls, the next number is advanced to head position with all of the numbers being moved forwardly one step. To connect the administrative telephone to the station which has just moved into head position, a single press of the asterisk button (rather than two separate pressings) suffices without need for hanging up. Only one pressing is necessary for each successive call because the flip-flop 356 which registers the receipt of the first asterisk remains turned on until the phone is finally hung up. This makes it possible for the person at any administrative telephone to answer a long series of awaiting calls by a succession of single pushes of the asterisk button, without having to hang up so that a minimum time is required per call.

Typical Cycle—Achievement of Priority

In accordance with one of the features of the present invention, means are associated with each staff telephone station for creating a priority signal so that a call-in may receive first attention regardless of its order of receipt. This is desirable in the case of an emergency in a school, a critically ill patient in a hospital, or analogous situation. The central exchange is responsive to such priority signal for automatically advancing the number of the staff station to the head position in the storage device and in the display column, while temporarily subordinating the other ones of the displayed numbers by moving them downwardly in the column.

This is accomplished by making use of the fact that the shift register SR, PSR has one bit position associated with each call referred to as the "priority bit". When this bit is set high, it causes the word contained in that memory position to be advanced by a series of exchanges to the top of the stack. Priority is normally signalled to the DCU when a staff station "repeats" a call-in that is already established by pressing call-in switch 530 at the staff station an additional time after creating the original call-in signal. In such event a match is detected by the comparator CED in the DCU between the display and the call-in data in temporary storage. Such match triggers the activation of a load cycle which reloads the number of the call-in station into the same memory cell as before, but this time with the priority bit high. In successive cycles of the shift register exchanges will then automatically take place based upon the sensing of this priority bit causing the number to go to the top of the display. In similar fashion any station that subsequently establishes priority for its call-in signal moves up into second position temporarily subordinating the calls stacked subsequently in the series, and so on.

The invention further contemplates use of an optional "separate" priority switch such as that shown at 820 (FIG. 11). In placing a call or the call in switch 530 is normally energized so that the number of the station shows up on the display panel DRO; however if priority is required, the second switch 820 is pressed to move the number of the station to head position in the display column. The switch 820 achieves priority by the fact that switching means are provided in the DCU (FIG. 7b) in the form of jumpered circuitry which enables the same priority mode to be changed from that just described to a separate priority switch mode. Removing the jumper 741 defeats the normal priority mode, and placing a jumper in position 825 achieves the separate priority mode. In this mode a separate priority switch 820 is required (FIG. 12) and the normal call-in switch 530 becomes optional. When the switch 820, which may be key controlled, is closed, two things occur: In the first place a ground signal is applied to the CIE which identifies the staff station in the same manner as occurred upon pressing the switch 530. When using the switch 820, however, the flow of current must pass through a terminal SPC on the DCU before reaching ground. The current is sensed by transistor 822 (FIG. 7b) which causes a pulse which sets the priority bit immediately high without requirement for a second pressing of a pushbutton, or making of a circuit, at the staff station.

The second or separate priority switch mode just described has advantages over the first priority mode in certain situations or in certain types of institutions. For example, where the separate priority switch is key operated, keys may be given to the staff personnel only in those rooms where hazards exist or where accidents are likely to occur so that callers from such rooms, only, may advance themselves to priority position in the stack.

In accordance with one of the features of the invention means are provided in the central exchange for flashing any number on a digital display device for which a priority signal has been received. This is accomplished by having a gate 772 in the DCU (FIG. 7a) whose input is responsive to status of the priority bits of the various call-ins in the shift register and also to the output of a priority flash timer 770, the output of the gate being used to blank the readout drivers (seven segment decoder) SSD (FIG. 7c) at intervals when the priority bit is present. This shows up as a flashing of the priority calls in the display DRO.

Means are further provided for producing an augmented alarm signal as long as a number exists in the display device for which a priority signal has been received. Such an augmented alarm signal is preferably in the form of a continued beeping sound. Such beeping sound is generated in the audible signalling device 682 (FIG. 8) provided at the administrative telephone designated for answering of call-ins. The control signal for the audible device 682 is obtained from the line 766 (FIG. 7a) which is an output from one of the flip-flop devices 710 wired to sense the presence of a priority bit in one of the memory locations of the shift register. When this output is high it feeds to the timer 679 which in turn produces a succession of output pulses which are inverted and amplified by the transistor 680 producing a signal at the terminal 681 which directly energizes the audible device 682.

Typical Cycle—Calling between Administrative Telephones

It is one of the more detailed features of the present system that a small number of administrative telephone sets are provided having a dial pad including an arbitrary symbol (e.g. *), the arbitrary symbol, upon being twice pressed, being capable of connecting any one of the administrative telephone sets to a staff telephone which is in the head position of a stack of calls. However, in addition, each of the administrative telephone sets can call another by dialing the arbitrary symbol followed by the number of the administrative telephone set being called.

When one of the administrators takes his telephone "off hook" and hears a dial tone provided by the tone receiver circuits TR of the MCU, he then pushes his asterisk (*) button which results in two tones being sent to the MCU and sensed by the tone receiver circuits TR. The two tones representing the asterisk are decoded and fed to the flip-flop 356 (FIG. 5b) putting the MCU in asterisk mode. Then when the administrator pushes the number of the administrative telephone being called, the tone information is converted to BCD form which is fed to the asterisk register 430 whose outputs are decoded to decimal form by the device 433 whose "one of 10" outputs activates a triac switching circuit which feeds an AC signal to the buzzer producing an audible signal at the desired administrative telephone. When the called telephone goes off hook, the two administrative telephones are interconnected and a conversation may ensue.

Staff Station Privacy

Means are provided at each staff station for selection of a condition of privacy. This is accomplished by closure of "privacy" switch 121 which grounds the voice coil of the speaker, which, in the "listen" mode, serves as a sensitive microphone. Such ground, applied to the "S" buss by the relay 501 when the station is selected serves to turn the transistor 120 in the VCM "on". The output signal from the transistor is applied to a muting terminal 120a on the compressor chip 38 (FIG. 6b) effectively turning off the "reverse" channel of amplification without, however, affecting the signal originating at the administrative telephone. Conveniently, the switch 121 may be mechanically interlocked with the call-in switch 530, for example, by placing the two switches on the opposite sides of a rocker so that when the call-in switch is operated the privacy switch is necessarily opened.

What is claimed is:

1. In an administrative telephone system the combination comprising a dialable administrative telephone set, a plurality of dialless staff telephone stations at remote room locations and having identifying numbers, means including a central exchange for interconnecting the administrative telephone set with the staff telephone stations, a digital display device associated with the administrative telephone set having a column of display positions, a call-in switch at each staff telephone station for signalling a desire to communicate with the administrator, means in the central exchange responsive to operation of one of the switches for causing the identifying number of such staff telephone station to be displayed at the head of the column in the digital display device accompanied by an alarm signal, means in the central exchange responsive to successive operation of the switches at other ones of the staff telephone stations for causing the identifying numbers of such staff telephone stations to be displayed in successive positions on the digital display device, means in the central exchange responsive to the dialing of a displayed number for causing the administrative telephone set to be connected to a staff telephone station or corresponding number for the carrying on of a conversation, and means in the central exchange for causing the dialed number to be extinguished and for causing each of the numbers in successive positions on the digital display device to move fowardly one step in the column of display positions.

2. In an administrative telephone system the combination comprising an administrative telephone set having a dial carrying both a set of numbers and an arbitrary symbol, a plurality of dialless staff telephone stations at remote room locations and having identifying numbers, means including a central exchange for interconnecting the administrative telephone set with the staff telephone stations, a digital display device associated with the administrative telephone set having a column of display positions, a call-in switch at each staff telephone station for signalling a desire to communicate with the administrator, means in the central exchange responsive to operation of one of the switches for causing the identifying number of the associated staff telephone station to be displayed at the end of the column in the digital display device, means responsive to the subsequent actuation of the switches at other ones of the staff telephone stations for causing the identifying numbers of such staff telephone stations to be displayed stacked in successive positions in the digital display device in the order of actuation, means in the central exchange responsive to dialing of the arbitrary symbol for causing the administrative telephone set to be connected to the staff telephone station identified by the number at the head of the column, means in the central exchange for thereafter causing the number at the head of the column to be extinguished and for causing the next number to be advanced to head position with all subsequent numbers being moved forwardly by one position, and alternative means in the central exchange responsive to the dialing of the number of any staff telephone station for connecting the administrative telephone set thereto.

3. The combination as claimed in claim 2 in which the means in the central exchange responsive to the dialing of the arbitrary symbol is responsive to (a) double actuation of the arbitrary symbol to connect the administrative telephone to the first of a series of call-in switches and (b) single actuation of the arbitrary symbol to connect the administrative telephone set to the call-in station whose number is next in the series.

4. In an administrative telephone system the combination comprising an administrative telephone set having a dial carrying both a set of numbers and an arbitrary symbol, a plurality of dialless staff telephone stations at remote room locations and having identifying numbers, means including a central exchange for interconnecting the administrative telephone set with the staff telephone stations, a digital display device associated with the administrative telephone set having a column of display positions, a call-in switch at each staff telephone station for signalling a desire to communicate with the administrator, means in the central exchange responsive to operation of one of the switches for causing the identifying number of the associated staff telephone station to be displayed at the head of the column in the digital display device, means responsive to the subsequent actuation of the switches at other ones of the staff telephone stations for causing the identifying numbers of such staff telephone stations to be displayed stacked in successive positions in the digital display device in the order of actuation, means in the central exchange responsive to dialing of the arbitrary symbol for causing the administrative telephone set to be connected to the staff telephone station identified by the number at the head of the column, means in the central exchange for thereafter causing the number at the head of the column to be extinguished and for causing the next number to be advanced to head position with all subsequent numbers being moved forwardly by one position, and means responsive to a successive dialing of the arbitrary symbol for automatically (a) disconnecting the administrative telephone set from the connected staff telephone station and (b) connecting the administrative telephone set to the staff telephone station corresponding to the next number in head position.

5. In an administrative telephone system the combination comprising a dialable administrative telephone set, a plurality of dialless staff telephone stations at remote room locations and having identifying numbers, a central exchange for interconnecting the administrative telephone set with the staff telephone stations, a call-in switch at each staff telephone station for signalling a desire to communicate with the administrator, a storage device in the central exchange, means in the central exchange responsive to successive actuation of the switches at the staff telephone stations for causing the identifying numbers of such staff telephone stations to be registered in successive positions in the storage device in the order of actuation, switch means operated by the dial on the administrative telephone set and means in the central exchange responsive thereto for connecting the administrative telephone set to the staff telephone station corresponding to the first number in the storage device, means in the central exchange for thereafter causing the first position in the storage device to be vacated and for causing each of the numbers in successive positions to advance forwardly one step in the storage device to fill the vacated position, and means including a digital display device associated with the administrative telephone set having a column of display positions for displaying at least the first few of the numbers currently being stored in the storage device.

6. The combination as claimed in claim 5 in which the means for causing each of the numbers in successive positions to be advanced includes means for producing successive interchanges between adjacent positions in the storage device so that the vacated position is successively transferred downwardly in the storage device.

7. In an administrative telephone system the combination comprising a dialable administrative telephone set, a plurality of dialless staff telephone stations at remote room locations and having identifying numbers, a central exchange for interconnecting the administrative telephone set with the staff telephone stations, a digital display device associated with the administrative telephone set having a column of display positions, means associated with the administrative telephone set for producing an alarm signal, a call-in switch at each staff telephone station for signalling a desire to communicate with the administrator, means in the central exchange responsive to momentary actuation of the switches at various staff telephone stations for causing the identifying numbers of the respective staff telephone stations to appear listed in the display positions of the digital display device in the order of actuation, and with entry of each in the display device accompanied by the alarm signal, manually operated switch means on the administrative telephone set and means in the central exchange responsive thereto for connecting the administrative telephone set to the staff telephone station corresponding to the number at the head of the column of display positions, means in the central exchange for thereafter causing the number in the head position to be extinguished and for causing the numbers in successive positions to move forwardly one step in the column of display positions to fill the resulting gap, switch means associated with at least a portion of the staff telephone stations for creating a priority signal, and means in the central exchange responsive to the priority signal from one of the staff telephone stations for advancing the number of such staff telephone station to the head of the column of display positions while temporarily subordinating the other ones of the displayed numbers.

8. The combination as claimed in claim 7 in which means are provided in the central exchange for flashing any number of the digital display device for which a priority signal has been received.

9. The combination as claimed in claim 7 in which means are provided in the central station for producing an augmented alarm signal as long as a number exists in the display device for which a priority signal has been received.

10. The combination as claimed in claim 7 in which the switch means for creating a priority signal is in the form of a separate switch arranged adjacent the call-in switch in those room locations for which priority capability is desired.

11. In an administrative telephone system the combination comprising a dialable administrative telephone set, a plurality of dialless staff telephone stations at remote room locations and having identifying numbers, a central exchange for interconnecting the administrative telephone set with the staff telephone stations, a digital display device associated with the administrative telephone set having a column of display positions, a call-in switch at each staff telephone station for signalling a desire to communicate with the administrator, means in the central exchange responsive to momentary actuation of the switches at various staff telephone stations for causing the identifying numbers of the respective staff telephone stations to appear listed in the display positions of the digital display device in the order of actuation, manually operated switch means on the administrative telephone set and means in the central exchange responsive thereto for connecting the administrative telephone set to the staff telephone station corresponding to the number in one of the display positions, means in the central exchange for thereafter causing the number to be extinguished and for causing the numbers in successive positions to move forwardly one step in the column of display positions to fill the resulting gap, switch means associated with at least a portion of the staff telephone stations for creating a priority signal, and means in the central exchange responsive to the priority signal from a staff telephone station for thereafter enchancing the display of that station to signal to the administrator the condition of priority continuously until the call-in of that station is answered.

12. In an administrative telephone system the combination comprising a dialable administrative telephone set, a plurality of dialless staff telephone stations at remote room locations and having identifying numbers, a central exchange for interconnecting the administrative telephone set with the staff telephone stations, a storage register in the central exchange for storing two digit numbers and having a limited number of storage spaces, a digital display device associated with the administrative telephone set having a column of display positions and coupled to the storage register for display of the numbers in at least the first few spaces in the register, a call-in switch at each staff telephone station for signalling a desire to communicate with with the administrator, means in the central exchange responsive to momentary actuation of the switches at various staff telephone stations for causing the identifying numbers of such staff telephone stations to be listed in the storage register and in the display positions of the digital display device in the order of actuation, manually operated switch means on the administrative telephone set and means in the central exchange responsive thereto for connecting the administrative telephone set to the staff telephone station corresponding to the number at the head of the column of display positions, means in the central exchange for thereafter causing the number in the head position to be extinguished and for causing the numbers in successive positions to move forwardly one step in the column of display positions to fill the resulting gap, switch means associated with at least a portion of the staff telephone stations for creating a priority signal, and means in the central exchange responsive to the priority signal from a staff telephone station for causing display of the number of such staff telephone station at the head of the column of display positions even when the storage register is full.

13. In an administrative telephone system the combination comprising a dialable administration telephone set, a plurality of dialless staff telephone stations at remote room locations and having identifying numbers, means including a central exchange for interconnecting the administrative telephone set with the staff telephone stations, a digital display device associated with the administrative telephone set having a column of display positions, means including a call-in switch at each staff telephone station for signalling a desire to communicate with the administrator, means in the central telephone exchange responsive to single momentary actuation of the call-in switch means at various staff telephone stations for causing the identifying numbers of such staff telephone stations to appear in order of actuation in the column of display positions, a manually push button operated switch at the administrative telephone set, means in the central exchange responsive to operation of the push button switch for automatically connecting the administrative telephone set to the staff telephone station whose number appears at the head of the column of display positions, and means in the central exchange for thereafter causing the number at the head of the column to be extinguished and for causing the numbers in successive positions in the digital display device to move forwardly one step in the column, and priority responsive means in the central exchange responsive to at least one additional actuation of the call-in switch means at a given one of the staff telephone stations for causing the number of such telephone station to be automatically advanced to the head of the column accompanied by flashing thereof to indicate existence of an emergency condition at such staff telephone station.

14. In an administrative telephone system the combination comprising a dialable administrative telephone set, a plurality of dialless staff telephone stations at remote room locations and having identifying numbers, means including a central exchange for interconnecting the administrative telephone set with the staff telephone stations, a digital display device associated with the administrative telephone set having a column of display positions, a call-in switch at each staff telephone station, means responsive to a single momentary actuation of the call-in switch at the various staff telephone stations to be displayed in the display device in the order of actuation, a manually operated switch at the administrative telephone set and means in the central exchange responsive thereto for causing the administrative telephone set to be connected to the staff telephone station corresponding to the number at the head of the column, means in the central exchange for thereafter causing the number at the head of the column to be extinguished and for causing the numbers in successive positions in the column to move forwardly on step to fill the resulting gap, means at each of the staff telephone stations for generating a priority signal, means in the central exchange responsive to the priority signal received from one of the staff telephone stations for causing the number of that station to be automatically advanced to the head of the column, and means in the central exchange responsive to a subsequently received priority signal from one of the other staff telephone stations for causing the number of such other staff telephone station to be automatically advanced to second position in the display device.

15. In an administrative telephone system the combination comprising a dialable administrative telephone set, a plurality of dialless staff telephone stations at remote room locations and having identifying numbers, means including a central exchange for selectively interconnecting the administrative telephone set with the staff telephone stations, a call-in switch at each staff telephone station, a storage register in the central exchange, means in the central exchange responsive to single momentary actuation of the respective switches at various staff telephone stations for recording in the storage register the numbers of the staff telephone stations in order of switch actuation, a digital display device associated with the administrative telephone set having a column of display positions for displaying in order numbers in the storage register starting with the first, means at each staff telephone station for generating a priority signal indicative of an emergency situation at such staff telephone station, and means in the central exchange responsive to successive receipt of priority signals from different staff telephone stations for automatically advancing the number of each such staff telephone station forwardly in the register to a priority position which depends upon the order in which the priority signals were received, and means in the digital display device actuated by the central exchange for modifying the display thereby to draw attention to the numbers for which priority signals have been received.

16. In an administrative telephone system the combination comprising a dialable administrative telephone set, a plurality of dialless staff telephone stations at remote room locations and having identifying numbers, each staff telephone station having a loudspeaker and having an adjacent call-in switch for signalling a desire to communicate with the administrator, a central exchange for interconnecting the administrative telephone set with the staff telephone stations, means in the central exchange responsive to the voice of the administrator for causing the loudspeaker to broadcast his voice in the "talk" mode and for utilizing the loudspeaker as a microphone in the "listen" mode when the administrator is not speaking, a digital display device associated with the administrative telephone set having a column of display positions, means in the central exchange responsive to momentary actuation of the switches at various staff telephone stations for causing the identifying numbers of the respective staff telephone stations to appear listed in the display positions of the digital display device in the order of actuation, manually operated switch means on the administrative telephone set and means in the central exchange responsive thereto for connecting the administrative telephone set to the staff telephone station corresponding to the number at the head of the column of display position, means in the central exchange for thereafter causing the number in the head position to be extinguished and for causing the numbers in successive positions to move forwardly one step in the column of display positions to fill the resulting gap.

17. The combination as claimed in claim 16 in which switch means are provided associated with a call-in switch at a staff station for temporarily disabling the loudspeaker's function as a microphone thereby to prevent eavesdropping at the staff station.

18. In an administrative telephone system the combination comprising, a small number of administrative telephone sets being effectively connected in parallel, each administrative telephone set having a dial pad including a set of numbers as well as an arbitrary symbol, a much larger number of dialless staff telephone stations, the staff telephone stations being at room locations remote from one another and having identifying numbers, means including a central exchange for interconnecting the administrative telephone sets with the staff telephone stations, a digital display device associated with one of the administrative telephone sets having a column of display positions, a call-in switch associated with each staff telephone station, means in the central exchange responsive to actuation of the switches at various ones of the staff telephone stations for causing the identifying numbers of such staff telephone stations to appear in display positions of the digital display device in the order of actuation, means in the central exchange responsive to dialing of a displayed number at the associated administrative telephone set for causing the latter to be connected to a staff telephone station of corresponding number for the carrying on of a conversation, means in the central exchange for thereafter causing the dialed number to be extinguished in the display device and for causing the number in successive positions to move one step forwardly therein, and means in the central exchange responsive to the dialing of the arbitrary symbol at any of the administrative telephone sets for connecting such telephone set automatically to the staff telephone station whose number is in leading position in the display device.

19. In an administrative telephone system the combination comprising, a small number of administrative telephone sets each having an identifying number, each administrative telephone set having a dial pad including at least one arbitrary symbol, a much larger number of dialless staff telephone stations each having an identifying number, the staff telephone stations being at room locations remote from one another, means including a central exchange for interconnecting the administrative telephone sets with one another and to the staff telephone stations, a digital display device associated with one of the administrative telephone sets and having a column of display positions, a call-in switch associated with each staff telephone station, means in the central exchange responsive to actuation of the call-in switches at respective ones of the staff telephone stations to appear in display positions of the digital display device in the order of actuation, means in the central station responsive to the pressing of one of the arbitrary symbols on the dial pad on any one of the administrative telephone sets for causing the latter to be connected to the staff telephone station at the head of the column, and means in the central exchange for enabling the administrative telephones to dial one another by the dialing of one of the arbitrary symbols followed by the identifying number of the administrative telephone being called.

* * * * *